(12) United States Patent
Zhou et al.

(10) Patent No.: US 12,537,888 B2
(45) Date of Patent: Jan. 27, 2026

(54) ROTATING SHAFT MECHANISM AND ELECTRONIC DEVICE

(71) Applicant: Huawei Technologies Co., Ltd., Shenzhen (CN)

(72) Inventors: Tengfei Zhou, Dongguan (CN); Zhicheng Zhang, Shenzhen (CN); Qiang Zhan, Shanghai (CN); Leilei Hua, Shanghai (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 127 days.

(21) Appl. No.: 18/645,848

(22) Filed: Apr. 25, 2024

(65) Prior Publication Data

US 2024/0275873 A1 Aug. 15, 2024

Related U.S. Application Data

(63) Continuation of application No. PCT/CN2022/126839, filed on Oct. 21, 2022.

(30) Foreign Application Priority Data

Oct. 26, 2021 (CN) .......................... 202111249416.3

(51) Int. Cl.
*G06F 1/16* (2006.01)
*H04M 1/02* (2006.01)
*H04M 1/03* (2006.01)

(52) U.S. Cl.
CPC ......... *H04M 1/022* (2013.01); *H04M 1/0249* (2013.01); *H04M 1/0268* (2013.01); *H04M 1/03* (2013.01)

(58) Field of Classification Search
CPC ..... G06F 1/1681; G06F 1/1624; G06F 1/1652
See application file for complete search history.

(56) References Cited

U.S. PATENT DOCUMENTS

| | | | |
|---|---|---|---|
| 10,036,188 B1 | 7/2018 | Yao et al. | |
| 10,209,746 B2 | 2/2019 | Baek | |
| 11,550,368 B2* | 1/2023 | Huang | ................ H04M 1/022 |
| 12,438,965 B2* | 10/2025 | Kim | .................... H04M 1/0268 |

(Continued)

FOREIGN PATENT DOCUMENTS

| | | |
|---|---|---|
| CN | 105652975 A | 6/2016 |
| CN | 107632662 A | 1/2018 |

(Continued)

*Primary Examiner* — Anthony Q Edwards
(74) *Attorney, Agent, or Firm* — Conley Rose, P.C.

(57) ABSTRACT

A rotating shaft mechanism includes a body, a first door plate, a second door plate, an intermediate door plate, a first connecting rod assembly, and a second connecting rod assembly. The first connecting rod assembly includes a first housing connecting rod, a first gear connecting rod, and a first secondary connecting rod. The rotating shaft mechanism further includes a first meshing transmission structure. The first housing connecting rod, the first gear connecting rod, the first secondary connecting rod, the first door plate, and the body form a crank-slider structure to drive the first door plate to rotate relative to the body. The first gear connecting rod drives the intermediate door plate to move relative to the body using the first meshing transmission structure.

20 Claims, 28 Drawing Sheets

(56) References Cited

U.S. PATENT DOCUMENTS

2020/0326751 A1* 10/2020 Kim .................. G06F 1/1616
2020/0329574 A1* 10/2020 Lee .................. H04M 1/0216

FOREIGN PATENT DOCUMENTS

| CN | 209724948 U | 12/2019 |
| CN | 111698355 A | 9/2020 |
| CN | 111885235 A | 11/2020 |
| WO | 2021129882 A1 | 7/2021 |

* cited by examiner

Part of 100

Part of 100

Part of 100

ROTATING SHAFT MECHANISM AND ELECTRONIC DEVICE

CROSS-REFERENCE TO RELATED APPLICATIONS

This is a continuation of International Patent Application No. PCT/CN2022/126839 filed on Oct. 21, 2022, which claims priority to Chinese Patent Application No. 202111249416.3 filed on Oct. 26, 2021. The disclosures of the aforementioned applications are hereby incorporated by reference in their entireties.

TECHNICAL FIELD

This application relates to the field of electronic device technologies, and in particular, to a rotating shaft mechanism and an electronic device having the rotating shaft mechanism.

BACKGROUND

Currently, foldable displays are widely used in mobile terminals, for example, foldable mobile phones or foldable tablets. In such mobile terminals, the foldable displays are mainly implemented by combining flexible displays and rotating shaft mechanisms. In a process of using the mobile terminal, because the flexible display is repeatedly folded, the flexible display may be damaged.

To prolong a service life of the flexible display and improve reliability of a foldable electronic device, a folding part of the flexible display needs to have specific curvature deformation. In addition, curvature uniformity of all parts of the folding part of the flexible display also has important effect on prolonging the service life of the flexible display. A key to implementing the curvature deformation and the curvature uniformity of all the parts of the folding part of the flexible display lies in the rotating shaft mechanism of the electronic device. Therefore, how to design the rotating shaft mechanism to improve reliability of the flexible display is an urgent problem to be resolved currently.

SUMMARY

This application provides a rotating shaft mechanism and an electronic device having the rotating shaft mechanism. A main objective is to provide a rotating shaft mechanism whose length can change as the electronic device is folded and unfolded.

The following technical solutions are used in embodiments of this application, to achieve the foregoing objective.

According to a first aspect, this application provides a rotating shaft mechanism. The rotating shaft mechanism may be used in a foldable electronic device having a flexible display, for example, may be used in a device such as a foldable mobile phone or a foldable tablet computer.

The rotating shaft mechanism includes a body, a first door plate, a second door plate, an intermediate door plate, a first connecting rod assembly, and a second connecting rod assembly. The first door plate, the second door plate, and the intermediate door plate are located on a same side of the body, the first door plate and the second door plate are disposed opposite to each other on two sides of the intermediate door plate. The first connecting rod assembly and the second connecting rod assembly are disposed opposite to each other on two sides of the body. The rotating shaft mechanism further includes a first meshing transmission structure and a second meshing transmission structure.

The first connecting rod assembly includes a first housing connecting rod, a first gear connecting rod, and a first secondary connecting rod. One end that is of the first gear connecting rod and that is close to the body is rotatably connected to the body, one end that is of the first gear connecting rod and that is away from the body is slidably connected to the first housing connecting rod, one end that is of the first gear connecting rod and that is close to the intermediate door plate is further connected to the intermediate door plate in a meshed manner through the first meshing transmission structure, one end of the first door plate is rotatably connected to the first housing connecting rod, the other end of the first door plate is rotatably connected to one end of the first secondary connecting rod, the other end of the first secondary connecting rod is rotatably connected to the body, and the first secondary connecting rod is slidably connected to the intermediate door plate. The second connecting rod assembly includes a second housing connecting rod, a second gear connecting rod, and a second secondary connecting rod. One end that is of the second gear connecting rod and that is close to the body is rotatably connected to the body, one end that is of the second gear connecting rod and that is away from the body is slidably connected to the second housing connecting rod, one end that is of the second gear connecting rod and that is close to the intermediate door plate is further connected to the intermediate door plate in a meshed manner through the second meshing transmission structure, one end of the second door plate is rotatably connected to the second housing connecting rod, the other end of the second door plate is rotatably connected to one end of the second secondary connecting rod, the other end of the second secondary connecting rod is rotatably connected to the body, and the second secondary connecting rod is slidably connected to the intermediate door plate.

When the first gear connecting rod and the second gear connecting rod rotate toward each other, the first gear connecting rod and the intermediate door plate that are connected in the meshed manner and the second gear connecting rod and the intermediate door plate that are connected in the meshed manner drive the intermediate door plate to move in a direction close to the body, the first housing connecting rod drives one end that is of the first door plate and that is close to the body to move in a direction away from the body, and the second housing connecting rod drives one end that is of the second door plate and that is close to the body to move in a direction away from the body.

When the first gear connecting rod and the second gear connecting rod rotate away from each other, the first gear connecting rod and the intermediate door plate that are connected in the meshed manner and the second gear connecting rod and the intermediate door plate that are connected in the meshed manner drive the intermediate door plate to move in a direction away from the body, the first housing connecting rod drives one end that is of the first door plate and that is close to the body to move in a direction close to the body, and the second housing connecting rod drives one end that is of the second door plate and that is close to the body to move in a direction close to the body.

In the rotating shaft mechanism provided in this application, the first door plate and the second door plate that are located on two sides of the intermediate door plate may rotate reversely relative to the body under driving of the corresponding first housing connecting rod and second housing connecting rod. In this way, when the flexible display is disposed on a side that is of the first door plate, the intermediate door plate, and the second door plate and that is away from the body, and the first door plate and the second door plate rotate toward each other relative to the body, the electronic device can be folded. In contrast, when the first door plate and the second door plate rotate away from each other relative to the body, the electronic device can be unfolded.

In addition, in the rotating shaft mechanism provided in this application, the intermediate door plate located between the first door plate and the second door plate may move relative to the body. When the first door plate and the second door plate rotate toward each other, that is, when the electronic device switches from a flattened state to a closed state, the intermediate door plate moves close to the body. In this way, a length size of the rotating shaft mechanism may be increased, and the first door plate, the intermediate door plate, and the second door plate form an accommodating cavity close to a triangular structure through enclosure. A flexible display part that is folded and that is close to the rotating shaft mechanism is located in the formed accommodating cavity, and is not squeezed. Therefore, a phenomenon that the flexible display is damaged due to a plurality of times of folding and squeezing may be avoided. When the first door plate and the second door plate rotate away from each other, that is, when the electronic device rotates from a closed state to a flattened state, the intermediate door plate moves away from the body. In this way, a previously increased length of the rotating shaft mechanism may be shortened until the first door plate, the intermediate door plate, and the second door plate are in a same plane after the movement, to support a flattened flexible display.

In addition, the movement of the intermediate door plate herein is implemented through meshing transmission between the first gear connecting rod and the intermediate door plate and meshing transmission between the second gear connecting rod and the intermediate door plate. In this design, compared with friction transmission, the meshing transmission may accurately control sinking and rising of the intermediate door plate, further accurately control the length size of the rotating shaft mechanism, and forms an appropriate accommodating space through enclosure for a folded flexible display.

Further, in the rotating shaft mechanism in this application, the first secondary connecting rod and the second secondary connecting rod are introduced, the intermediate door plate slidably cooperates with the first secondary connecting rod, and the intermediate door plate slidably cooperates with the second secondary connecting rod, so that rotating positions of the first door plate and the second door plate may be accurately controlled. In addition, the first gear connecting rod driving the first housing connecting rod to rotate is connected to the intermediate door plate in the meshed manner, and the second gear connecting rod driving the second housing connecting rod to rotate is also connected to the intermediate door plate in the meshed manner, so that the first housing connecting rod, a first meshing connecting rod, the first secondary connecting rod, the second housing connecting rod, a second meshing connecting rod, the second secondary connecting rod, the first door plate, the second door plate, and the intermediate door plate form a unified and coordinated mechanical linkage mechanism, and a length change of the rotating shaft mechanism and movement positions of the first door plate, the second door plate, and the intermediate door plate are accurately controlled.

In a possible implementation of the first aspect, the first meshing transmission structure includes a first gear formed at one end that is of the first gear connecting rod and that is close to the intermediate door plate, and a first rack formed on the intermediate door plate and that is externally meshed with the first gear; and/or the second meshing transmission structure includes a second gear formed at one end that is of the second gear connecting rod and that is close to the intermediate door plate, and a second rack that is formed on the intermediate door plate and that is externally meshed with the second gear, where a rotation axis of the first gear is parallel to a rotation axis of the first gear connecting rod, a rotation axis of the second gear is parallel to a rotation axis of the second gear connecting rod, and both an extension direction of the first rack and an extension direction of the second rack are perpendicular to a length direction of the intermediate door plate.

In other words, a gear and a rack are in transmission cooperation such that the intermediate door plate moves up and down relative to the body. The meshing transmission structure has a simple structure, occupies a small space, and transmission is stable.

In a possible implementation of the first aspect, the rotating shaft mechanism further includes a first screen pushing structure; and when the first gear connecting rod and the second gear connecting rod rotate away from each other, to drive the first door plate and the second door plate to rotate away from each other, the first screen pushing structure can apply a push force to the first housing connecting rod in a direction away from the first gear connecting rod.

Because the first screen pushing structure may apply the push force to the first housing connecting rod to be away from the first gear connecting rod, and a housing carrying the flexible display is relatively fixed to the first housing connecting rod, the first screen pushing structure may further apply a push force to the first housing. In this way, for example, when the first door plate, the intermediate door plate, and the second door plate are in the same plane, a flexible display disposed in the first housing may be expanded, to eliminate a wrinkle phenomenon of the flexible display, improve flatness of the flexible display, and improve user experience.

In a possible implementation of the first aspect, the rotating shaft mechanism further includes a second screen pushing structure, and the second screen pushing structure is disposed between the second housing connecting rod and the second gear connecting rod. When the first gear connecting rod and the second gear connecting rod rotate away from each other, to drive the first door plate and the second door plate to rotate away from each other until the first door plate, the intermediate door plate, and the second door plate are in the same plane, the second screen pushing structure can apply a push force to the second housing in a direction away from the second gear connecting rod.

Same as the first screen pushing structure, the second screen pushing structure may expand the flexible display, eliminate the wrinkle phenomenon, and improve user experience.

In a possible implementation of the first aspect, the first screen pushing structure includes a mounting hole provided in the first gear connecting rod, and a support rod that is formed on the first housing connecting rod and that can extend into the mounting hole; the first screen pushing structure further includes an elastic piece, and one end of the elastic piece is sleeved on the support rod; and when the first door plate, the second door plate, and the intermediate door plate are in the same plane, the support rod extends into the mounting hole, and the other end of the elastic piece abuts against the mounting hole, to apply an elastic force to the first housing connecting rod in the direction away from the first gear connecting rod.

In other words, when the first door plate and the second door plate are flattened, a distance between the first housing connecting rod and the first gear connecting rod is shortened. The elastic piece is compressed, and is in an energy storage state. The elastic piece can generate an elastic force for pushing the first housing connecting rod outward. Because the first housing is fixedly connected to the first housing connecting rod and the flexible display is attached to the first housing, a function of expanding the flexible display and eliminating a crease may be implemented.

In a possible implementation of the first aspect, the first housing connecting rod is provided with an embedded groove, the first gear connecting rod is slidably disposed in the embedded groove, the support rod is disposed in the embedded groove, an extension direction of the support rod is consistent with a direction in which the first gear connecting rod slides relative to the first housing connecting rod, and the mounting hole is provided on a surface that is of the first gear connecting rod and that is opposite to the support rod.

In this way, a relative sliding structure between the first housing connecting rod and the first gear connecting rod and the first screen pushing structure between the first housing connecting rod and the first gear connecting rod are disposed in a centralized manner, so that a structure of a rotating shaft structure is more compact.

In a possible implementation of the first aspect, the rotating shaft mechanism further includes a guide structure, where the guide structure is configured to guide the intermediate door plate to move relative to the body along a direction perpendicular to the length direction of the intermediate door plate.

The guide structure is introduced to guide the intermediate door plate to move up and down linearly relative to the body.

In a possible implementation of the first aspect, the guide structure includes: a guide hole provided in the body and a guide block slidably disposed in the guide hole, where the guide hole extends along the direction perpendicular to the length direction of the intermediate door plate, and the guide block is fixed on the intermediate door plate.

In the foregoing technical solution, the guide block is relatively fixed to the intermediate door plate, the guide hole is provided in the body, and the guide block slides in the guide hole, to guide the intermediate door plate to move linearly. It may be understood that, in another implementation, the guide block is disposed in the body, and the guide hole is provided in the intermediate door plate. In short, the guide block slidably cooperates with the guide hole, to guide the intermediate door plate to move linearly.

In a possible implementation of the first aspect, there are a plurality of guide structures. Some of the plurality of guide structures are arranged along the length direction of the intermediate door plate, and the remaining guide structures of the plurality of guide structures are arranged along a width direction of the intermediate door plate.

The guide structures are disposed in a plurality of orientations such that the intermediate door plate is further promoted to move linearly relative to the body in a balanced and stable manner.

In a possible implementation of the first aspect, the rotating shaft mechanism further includes a first damping structure, where the first damping structure is disposed between the first housing connecting rod and the body; one end that is of the first damping structure and that is close to the first housing connecting rod is slidably connected to the first housing connecting rod, and one end that is of the first damping structure and that is close to the body is rotatably connected to the body; and when the first housing connecting rod drives the first door plate to rotate relative to the body, the first damping structure is configured to apply resistance to the first housing connecting rod.

It may be put in this way, when the first housing rotates, the first damping structure applies resistance to the first housing connecting rod such that the first housing connecting rod may suspend when the first housing connecting rod rotates relative to the body. In addition, because the first housing carrying the flexible display is fixedly connected to the first housing connecting rod, a suspending requirement in a folding process of the flexible display may be met, and user experience is improved.

In a possible implementation of the first aspect, the first damping structure includes a first cam connecting rod, a first cam, a first damping pin shaft, and a first damping elastic piece, where the first damping pin shaft is fixed on the body, and an extension direction of the first damping pin shaft is consistent with a direction of the rotation axis of the first gear connecting rod relative to the body. The first cam is slidably disposed on the first damping pin shaft. One end that is of the first cam connecting rod and that is close to the body is rotatably mounted on the first damping pin shaft, one end that is of the first cam connecting rod and that is away from the body is slidably connected to the first housing connecting rod, the end that is of the first cam connecting rod and that is close to the body has a first damping surface opposite to the first cam and a second damping surface, and the first cam has a third damping surface and a fourth damping surface. The first damping elastic piece is sleeved on the first damping pin shaft. When the first housing connecting rod drives the first cam connecting rod to rotate until the first damping surface abuts against the third damping surface, the first damping elastic piece is in the energy storage state, to generate a force for the first cam connecting rod to flatten the first door plate. When the first housing connecting rod drives the first cam connecting rod to rotate until the second damping surface abuts against the fourth damping surface, the first damping elastic piece is in the energy storage state, to generate a force for the first cam connecting rod to close the first door plate.

In a possible implementation of the first aspect, the first cam connecting rod includes a cam part, a first connecting rod part and a second connecting rod part. The cam part is rotatably mounted on the first damping pin shaft. The first connecting rod part and the second connecting rod part are arranged in parallel, one end of the first connecting rod part and one end of the second connecting rod part are both connected to the cam part, and the other end of the first connecting rod part and the other end of the second connecting rod part are both slidably connected to the first housing connecting rod.

In a possible implementation of the first aspect, the rotating shaft mechanism further includes a second damping structure, where the second damping structure includes a second cam connecting rod, a second cam, a second damping pin shaft, and a second damping elastic piece. The second damping pin shaft is fixed on the body, and an extension direction of the second damping pin shaft is consistent with the extension direction of the first damping pin shaft. The second cam is slidably disposed on the second damping pin shaft. The first cam is connected to the second cam such that the first cam and the second cam move synchronously. One end that is of the second cam connecting rod and that is close to the second cam is rotatably mounted on the second damping pin shaft, and the other end is slidably connected to the second housing connecting rod.

The second cam of the second damping structure is connected to the first cam of the first damping structure such that when the first housing and the second housing rotate, both the first housing and the second housing are subject to a damping force, and the flexible display is symmetrically at a suspending position.

In a possible implementation of the first aspect, when the first gear connecting rod and the second gear connecting rod rotate away from each other, to drive the first door plate and the second door plate to rotate away from each other to a first position, the first door plate, the intermediate door plate, and the second door plate are in the same plane, to form a support surface.

In other words, driven by the first gear connecting rod and the second gear connecting rod, the first door plate, the intermediate door plate, and the second door plate may be in the same plane, to support the flattened flexible display, and a user may perform an operation on the flattened flexible display.

In a possible implementation of the first aspect, when the first gear connecting rod and the second gear connecting rod rotate toward each other, to drive the first door plate and the second door plate to rotate toward each other to a second position, the first door plate, the intermediate door plate, and the second door plate form a display accommodating space through enclosure. The first position herein may be understood as a position in which the first door plate and the second door plate are located when the electronic device is in the closed state. In this case, the first door plate and the second door plate may form a preset included angle, and the intermediate door plate sinks to a preset position. A space similar to a triangle but open may be formed between the first door plate, the intermediate door plate, the second door plate, and a bent part of the flexible display is accommodated in the space.

It may be put in this way, when the first gear connecting rod and the second gear connecting rod rotate toward each other until the electronic device is in the closed state, the length size of the rotating shaft mechanism is increased, to increase a curvature radius of the flexible display, and prevent the flexible display from being squeezed.

In a possible implementation of the first aspect, the first secondary connecting rod has a first surface and a second surface that are opposite to each other. A first rotating shaft is disposed at a position that is on the first surface and that is close to the first door plate, a first rotating hole is provided at a position that is on a surface of the first door plate facing the body and that is close to the first secondary connecting rod, and the first rotating shaft rotates relative to the first rotating hole, so that the first door plate and the first secondary connecting rod are rotatably connected. A second rotating shaft is disposed at a position that is on the first surface and that is close to the body, a second rotating hole is provided at a position that is on the body and that is close to the first secondary connecting rod, and the second rotating shaft rotates relative to the second rotating hole, so that the body and the first secondary connecting rod are rotatably connected.

In a possible implementation of the first aspect, a track groove is provided on the second surface, a sliding pin is provided at a position that is of the intermediate door plate and that is close to the first secondary connecting rod, and the sliding pin slides relative to the track groove, so that the intermediate door plate is slidably connected to the first secondary connecting rod.

In a possible implementation of the first aspect, a surface that is of the first door plate and that faces the body has a first door plate arcuate bump extending toward the first housing connecting rod, a first arcuate clamping groove for assembling the first door plate arcuate bump is provided in the first housing connecting rod, and the first door plate arcuate bump slides relative to the first arcuate clamping groove, so that the first door plate is rotatably connected to the first housing connecting rod.

According to a second aspect, this application further provides an electronic device. The electronic device includes a first housing, a second housing, a flexible display, and the rotating shaft mechanism in any implementation of the first aspect, where the first housing is fixedly connected to the first housing connecting rod, and the second housing is fixedly connected to the second housing connecting rod. The first housing includes a first surface, the second housing includes a second surface, the flexible display consecutively covers the first surface of the first housing, the rotating shaft mechanism, and the second surface of the second housing, and the flexible display is fixedly connected to each of the first surface of the first housing and the second surface of the second housing.

In the electronic device provided in this application, because the rotating shaft mechanism in the first aspect is included, when the first housing and the second housing move toward each other, not only the first door plate and the second door plate in the rotating shaft mechanism generate rotatory movement, but also the intermediate door plate located between the first door plate and the second door plate moves toward the body. This avoids a sufficient accommodating space for a flexible display folded, and prevents the flexible display from being squeezed and deformed. In contrast, when the first housing and the second housing move away from each other, and the flexible display is driven to be flattened, the intermediate door plate moves away from the body until the first door plate, the intermediate door plate, and the second door plate are in the same plane, to support the flattened flexible display.

In addition, the intermediate door plate is driven to move relative to the body through meshing transmission such that movement precision of the intermediate door plate may be improved.

In a possible implementation of the second aspect, the flexible display includes a first region, a second region, a third region, a fourth region, and a fifth region that are consecutively disposed. The first region is fixedly connected to the first surface of the first housing. The second region is fixedly connected to a surface that is of the first door plate and that faces the flexible display. The third region is disposed relative to the intermediate door plate, and the third region can move relative to the intermediate door plate. The fourth region is fixedly connected to a surface that is of the second door plate and that faces the flexible display. The fifth region is fixedly connected to the second surface of the second housing.

In a possible implementation of the second aspect, the rotating shaft mechanism includes a decorative cover; when the electronic device is flattened, the decorative cover is hidden in the first housing and the second housing; and when the electronic device is folded, the decorative cover is exposed outside the first housing and the second housing, to fill a gap between the first housing and the second housing.

In other words, regardless of whether the electronic device is in a folded state or in the flattened state, the first housing and the second housing are both seamlessly closed when seen from an appearance of the electronic device. This further improves appearance beauty of the display device.

In a possible implementation of the second aspect, the electronic device includes a mobile terminal, for example, may be a foldable mobile phone, a foldable tablet, or a foldable e-book.

REFERENCE NUMERALS

Figure 1:
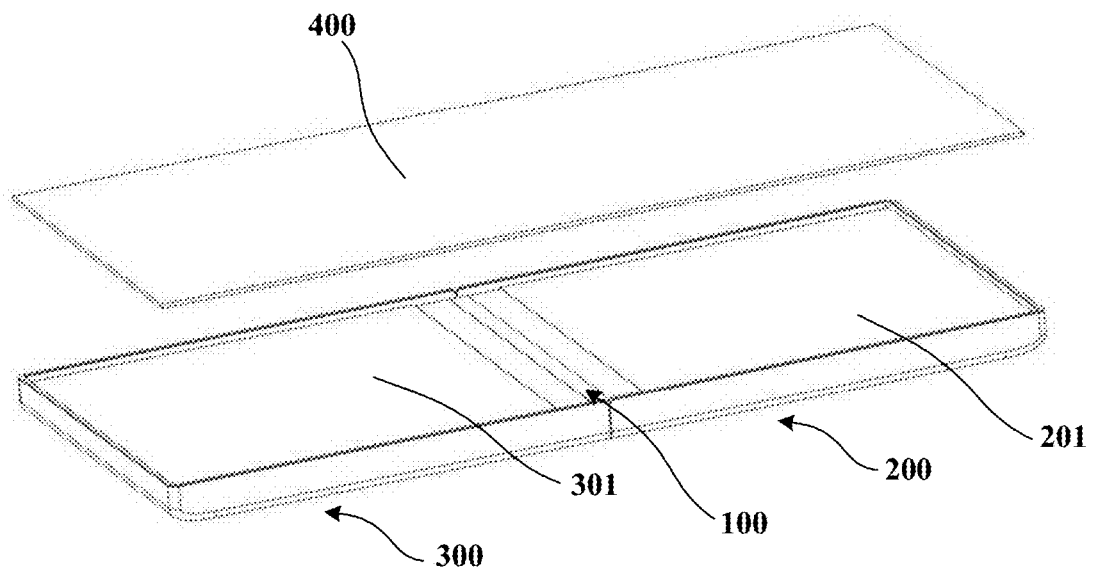
FIG. 1 is an exploded diagram of an electronic device in a flattened state according to an embodiment of this application.

100: Rotating shaft mechanism; 200: First housing; 201: First surface; 202: Third surface; 300: Second housing; 301: Second surface; 302: Fourth surface; 400: Flexible display;
11: Intermediate door plate; 11a: Sliding pin; 11b: Guide post;
12: First door plate; 12a: First door plate arcuate bump; 12b: First rotating hole;
13: Second door plate;
14: Body; 14b: Guide groove;
15: First connecting rod assembly; 151: First housing connecting rod; 151a: Sliding block; 151b: Embedded groove; 151c: First arcuate clamping groove; 151d: Support rod; 151e: Sliding groove; 151e1: First abutting surface; 151e2: Second abutting surface; 152: First gear connecting rod; 152a: Sliding groove; 152b: Mounting hole; 1521: Sliding part; 1522: Rotating part; 153: First secondary connecting rod; 153a: First rotating shaft; 153b: Second rotating shaft; 153c: Track groove;
16: Second connecting rod assembly; 161: Second housing connecting rod; 161a: Sliding block; 162: Second gear connecting rod; 162a: Sliding groove; 163: Second secondary connecting rod;
17: First meshing transmission structure; 171: First gear; 172: First rack;
18: Second meshing transmission structure;
19: Guide structure;
201: First screen pushing structure; 201a: Elastic piece; 202: Second screen pushing structure;
301: First damping structure; 301a: First cam connecting rod; 301a1: Cam part; 301a2: First connecting rod part; 301a3: Second connecting rod part; 301a4: Sliding block; 301b: First cam; 301c: First damping pin shaft; 301d: First damping elastic piece;
302: Second damping structure; 302a: Second cam connecting rod; 302b: Second cam;
302c: Second damping pin shaft; 302d: Second damping elastic piece;
303: Connecting rod;
304: Third damping pin shaft;
305: Fourth damping pin shaft;
21: Decorative cover.

DESCRIPTION OF EMBODIMENTS

The following describes embodiments of this application with reference to accompanying drawings in embodiments of this application.

An embodiment of this application provides a foldable electronic device. The foldable electronic device may include various electronic devices that have a flexible display and that can change an unfolded or folded form of the flexible display and the foldable electronic device. Under different use requirements, the foldable electronic device may be unfolded to a flattened state, or may be folded to a closed state, or may be in an intermediate state between the flattened state and the closed state. In other words, the foldable electronic device has at least two states: the flattened state and the closed state. In some cases, the foldable electronic device may further have a third state, namely the intermediate state between the flattened state and the closed state. It may be understood that the intermediate state is not a unique state, and may be any one or more states between the flattened state and the closed state of the electronic device.

For example, the foldable electronic device may be but is not limited to a mobile phone, a tablet computer, a notebook computer, an e-book reader, a camera, a wearable device, a home electronic device, or the like. For ease of understanding, in embodiments of this application, for example, the foldable electronic device is a mobile phone.

Figure 2:
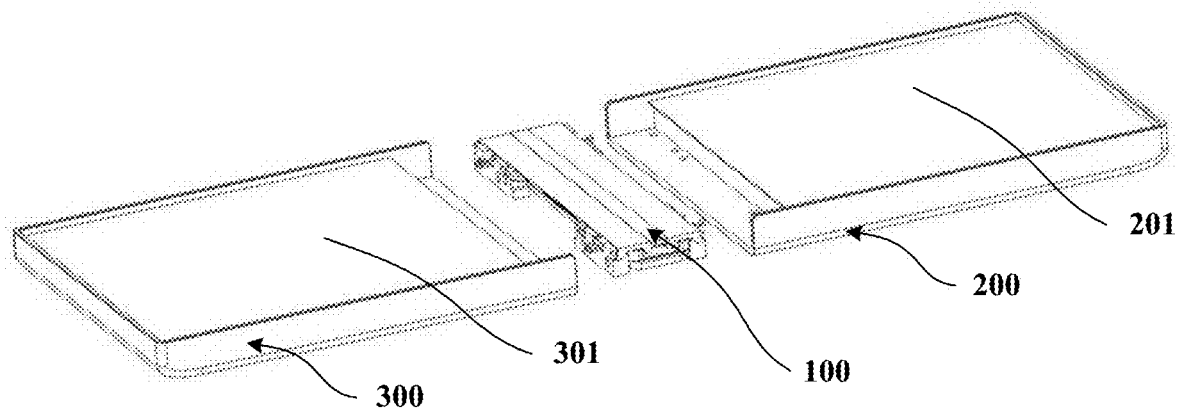
FIG. 2 is an exploded diagram of an electronic device that is in a flattened state and from which a flexible display is removed according to an embodiment of this application.

FIG. 1 is an exploded diagram of a foldable electronic device according to an embodiment of this application, and FIG. 2 is an exploded diagram of the foldable electronic device from which a flexible display 400 is removed according to an embodiment of this application. With reference to FIG. 1 and FIG. 2, the foldable electronic device may include a rotating shaft mechanism 100, a first housing 200, a second housing 300, and the flexible display 400.

The first housing 200 and the second housing 300 are disposed on two sides of the rotating shaft mechanism 100 and are separately connected to the rotating shaft mechanism 100. The rotating shaft mechanism 100 can move such that the first housing 200 and the second housing 300 are folded or unfolded relative to each other.

The first housing 200 and/or the second housing 300 may separately form a mounting space for mounting electronic components such as a circuit board, a battery, a receiver, a speaker, and a camera of the electronic device. The circuit board may integrate electronic components such as a main controller, a storage unit, an antenna module, and a power management module of the electronic device. The battery may supply power to the electronic components such as the flexible display 400, the circuit board, the receiver, the speaker, and the camera. The first housing 200 and the second housing 300 may be equal in thickness, or may be unequal in thickness. This is not limited in this embodiment of this application.

In a possible design, the mounting space may be provided in each of the first housing 200 and the second housing 300, to distribute the electronic components of the electronic device in the housings on two sides. In another possible design, the mounting space may be provided in only the first housing 200, to distribute the electronic components of the electronic device in the first housing 200 in a centralized manner; or the mounting space may be provided in each of the first housing 200 and the second housing 300, but most of the electronic components of the electronic device are disposed in the first housing 200, and a small part of the electronic components is disposed in the second housing 300, so that the second housing 300 is lighter, and folding and unfolding may be more conveniently performed.

Figure 3:
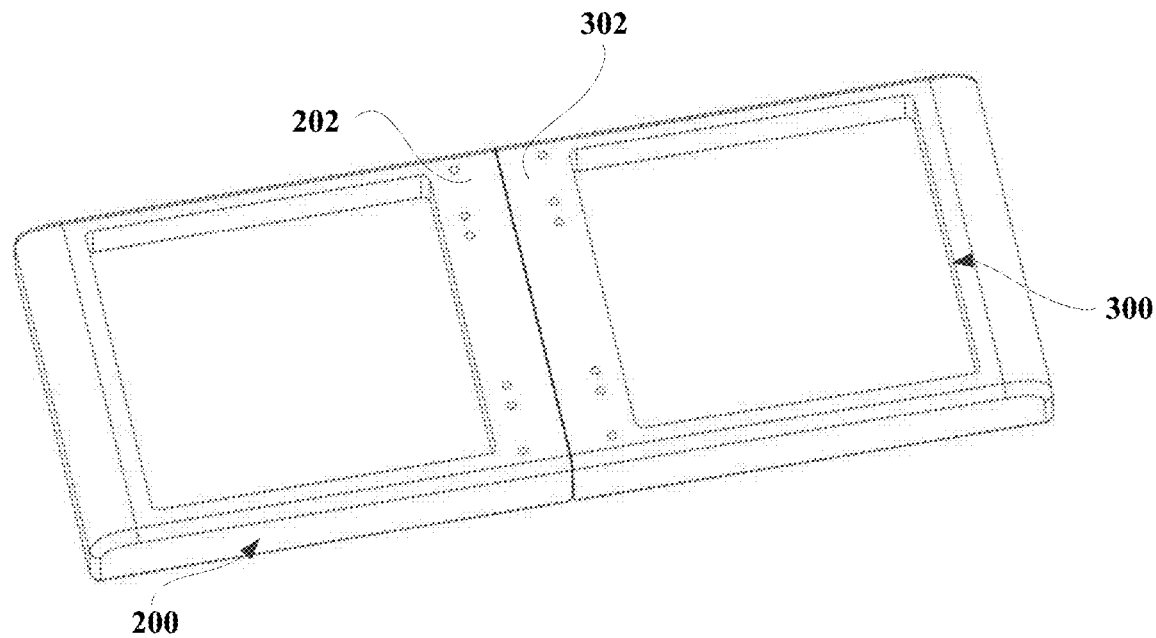
FIG. 3 is a diagram of a backside structure of an electronic device in a flattened state according to an embodiment of this application.

Refer to FIG. 2 and FIG. 3. FIG. 3 is a schematic diagram of a back structure of the foldable electronic device according to an embodiment of this application. In this embodiment of this application, the first housing 200 has a first surface 201 and a third surface 202 that is disposed away from the first surface 201, and the second housing 300 has a second surface 301 and a fourth surface 302 that is disposed away from the second surface 301. The first surface 201 of the first housing 200 and the second surface 301 of the second housing 300 may be jointly used to support the flexible display 400, and the third surface 202 of the first housing 200 and the fourth surface 302 of the second housing 300 may be used as appearance surfaces of the electronic device. In addition, it may be understood that in some application scenarios, a display may be further disposed on the third surface 202 of the first housing 200 and the fourth surface 302 of the second housing 300. The display may be a flexible display or a non-flexible display. This is not specifically limited herein.

Figure 4:
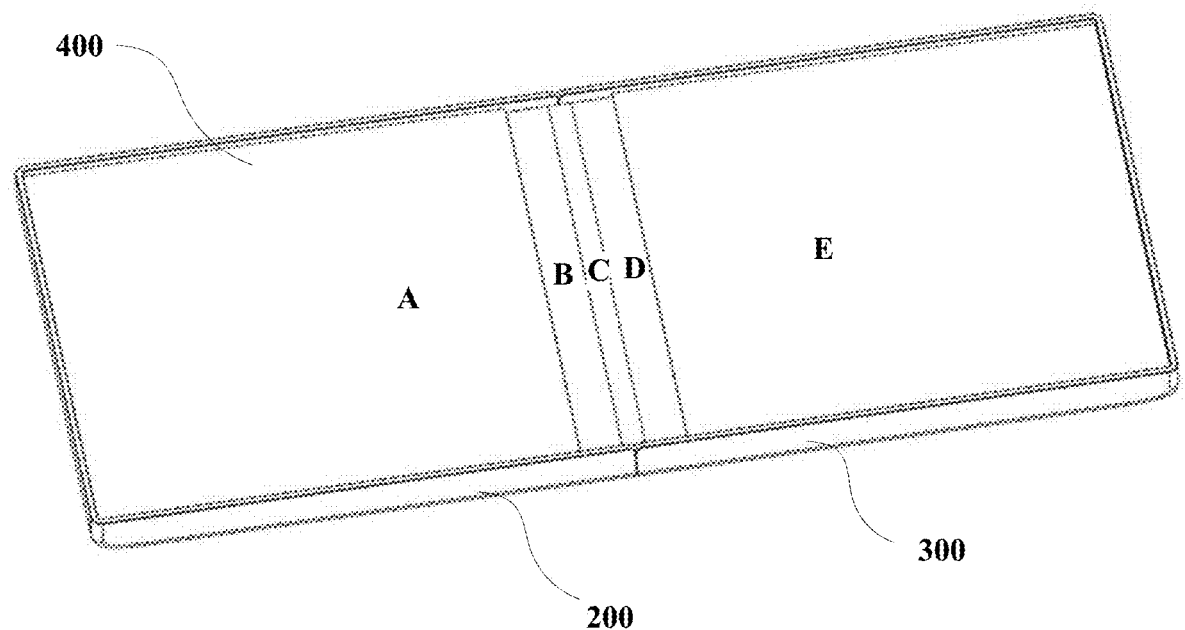
FIG. 4 is a diagram of a structure of an electronic device in a flattened state according to an embodiment of this application.

FIG. 4 is a schematic diagram of a structure of the electronic device in which the first housing 200 and the second housing 300 are unfolded relative to each other to a flattened state. In this embodiment of this application, when the first housing 200 and the second housing 300 are in the flattened state, with reference to FIG. 1 and FIG. 4, the first surface 201 of the first housing 200 and the second surface 301 of the second housing 300 are in a same plane. In this case, an included angle between the first surface 201 and the second surface 301 may be approximately 180° (a specific angle tolerance is also allowed, and the included angle between the first surface 201 and the second surface 301 is, for example, 165°, 177°, or 185°).

Further, refer to FIG. 1 and FIG. 4. The flexible display 400 consecutively covers the first surface 201 of the first housing 200, the rotating shaft mechanism 100, and the second surface 301 of the second housing 300 of the foldable electronic device. The flexible display 400 may be divided into consecutive regions A, B, C, D, and E. The regions B, C, and D include bent parts when the flexible display 400 is folded. The region A corresponds to the first surface 201 of the first housing 200, and may be fixedly connected to the first surface 201 of the first housing 200. The region E corresponds to the second surface 301 of the second housing 300, and may be fixedly connected to the second surface 301 of the second housing 300. It should be noted that boundaries of the regions B, C, and D shown in the figure are merely examples, and the boundaries of the regions B, C, and D may be adjusted based on a specific design of the rotating shaft mechanism 100.

Figure 5A:
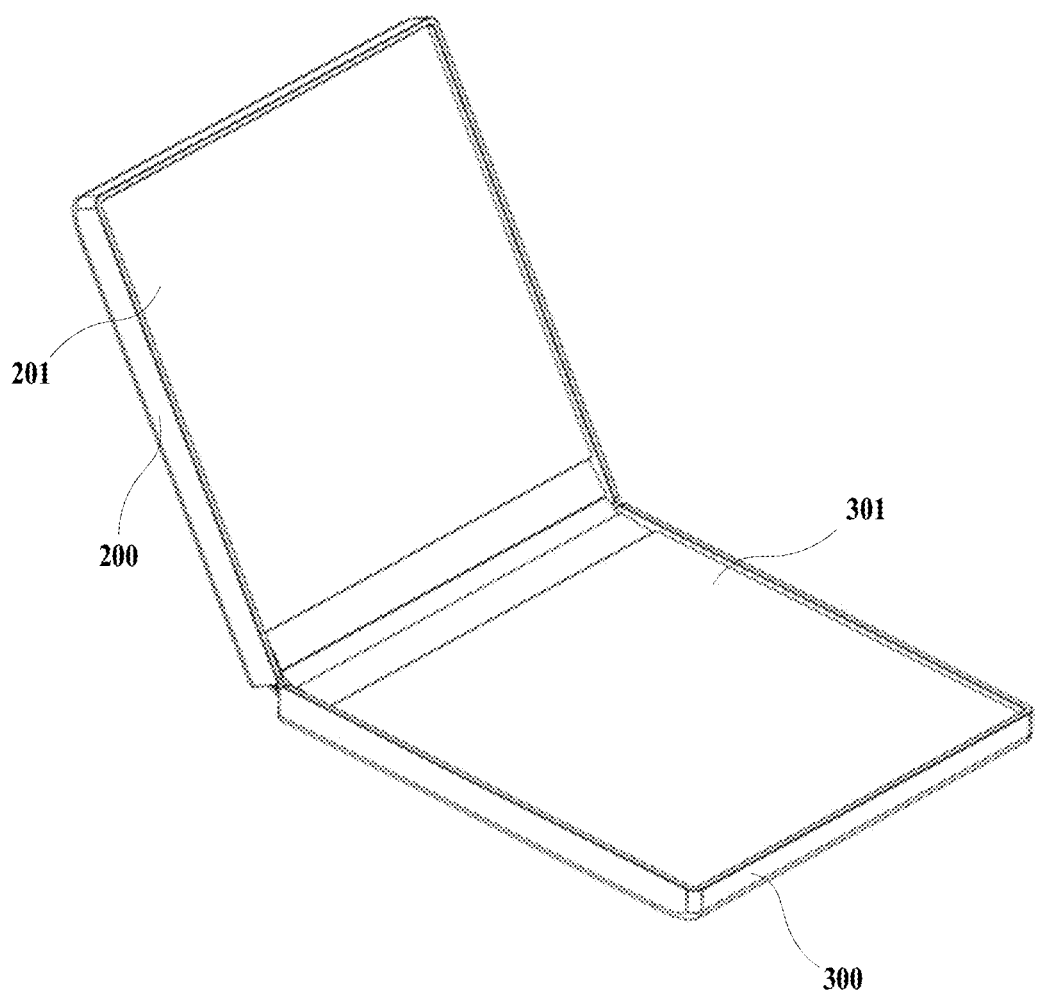
FIG. 5A is a diagram of a structure of an electronic device in an intermediate state according to an embodiment of this application.
Figure 5B:
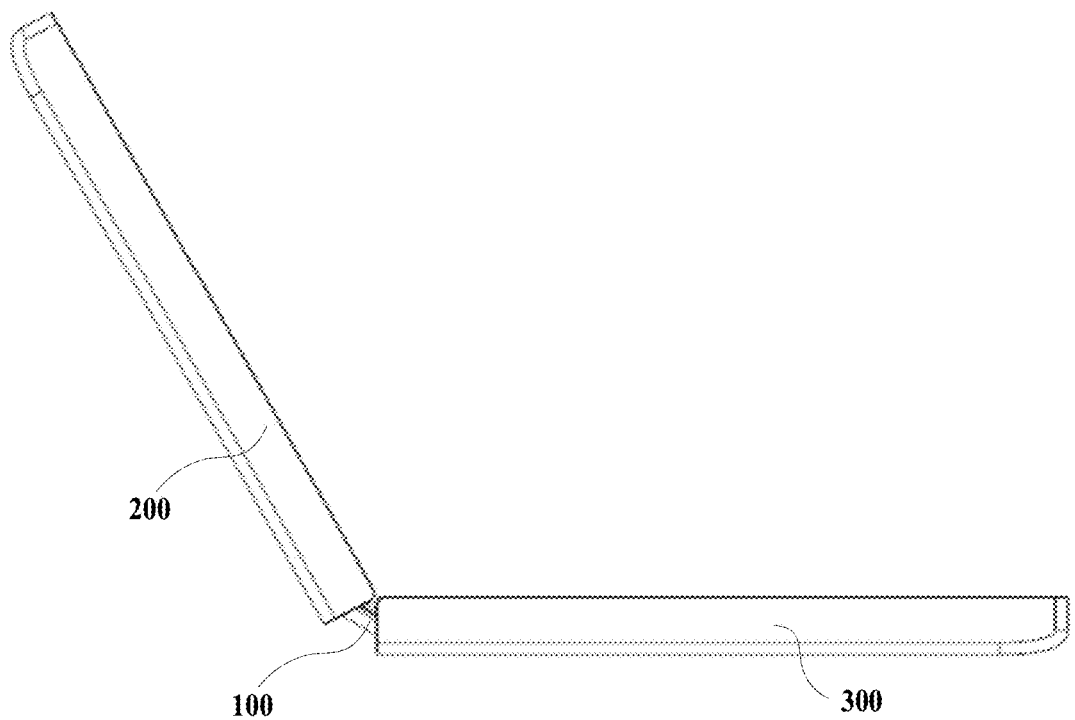
FIG. 5B is a side view of an electronic device in an intermediate state according to an embodiment of this application.

FIG. 5A is a schematic diagram of a structure of the electronic device in which the first housing 200 and the second housing 300 rotate (unfolded or folded) relative to each other to an intermediate state, and FIG. 5B is a side view of the electronic device in which the first housing 200 and the second housing 300 rotate (unfolded or folded) relative to each other to the intermediate state. The flexible display 400 is omitted in FIG. 5A, to display forms of the two housings in the intermediate state. In this case, the electronic device may be in any state between a flattened state and a closed state. For example, the included angle between the first surface 201 of the first housing 200 and the second surface 301 of the second housing 300 may range, for example, from 130° to 150°.

Figure 6:
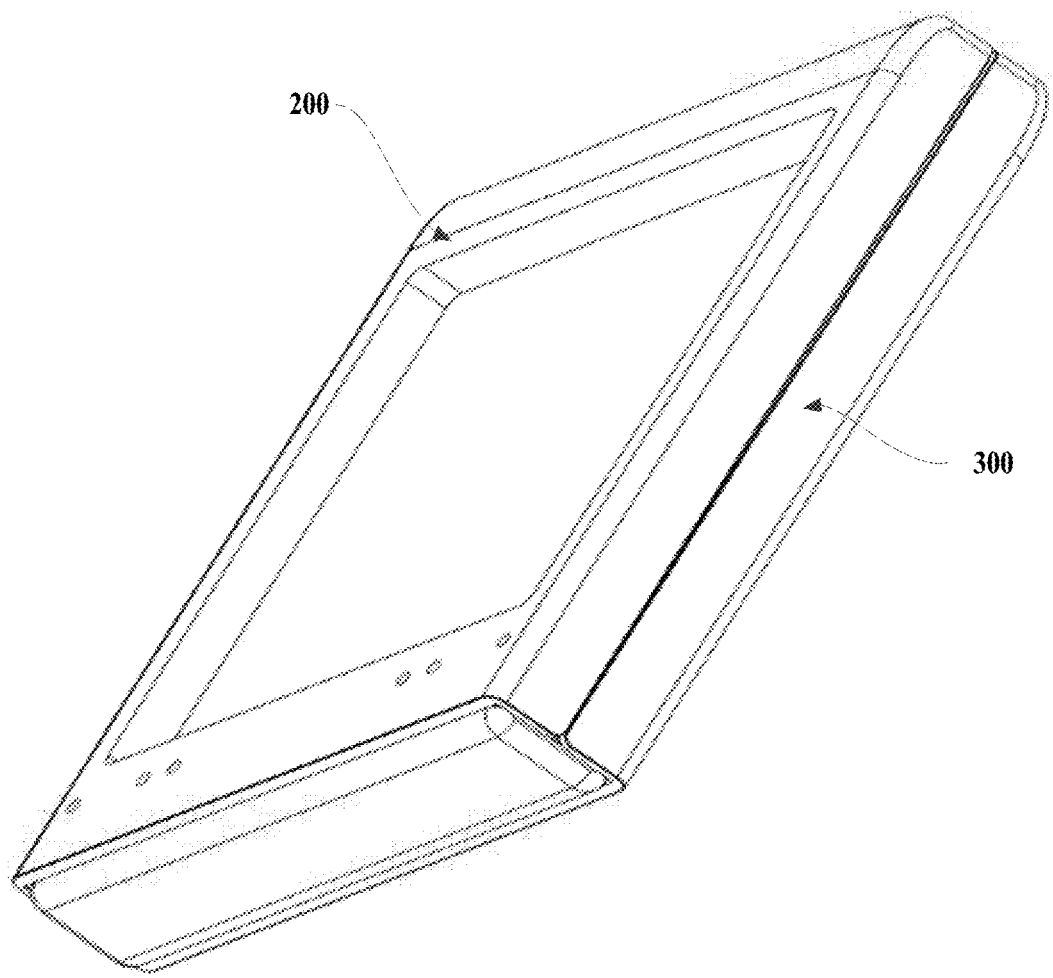
FIG. 6 is a diagram of a structure of an electronic device in a closed state according to an embodiment of this application.

FIG. 6 is a schematic diagram of a structure of the electronic device in which the first housing 200 and the second housing 300 are folded relative to each other to a closed state. Refer to FIG. 1 and FIG. 6. When the first housing 200 and the second housing 300 are in the closed state, the first surface 201 of the first housing 200 and the second surface 301 of the second housing 300 face each other or are away from each other (which is related to a folding manner). In this case, the first surface 201 of the first housing 200 and the second surface 301 of the second housing 300 may form a small included angle or may be parallel to each other, so that the two housings can be completely closed (a specific angle tolerance is also allowed).

The flexible display 400 can be configured to display information and provide an interaction interface for a user. In embodiments of this application, the flexible display 400 may be but is not limited to an organic light-emitting diode (OLED) display, an active matrix OLED (AMOLED) display, a mini OLED display, a micro LED display, a micro OLED display, a quantum dot LED (QLED) display, or the like.

Figure 7A:
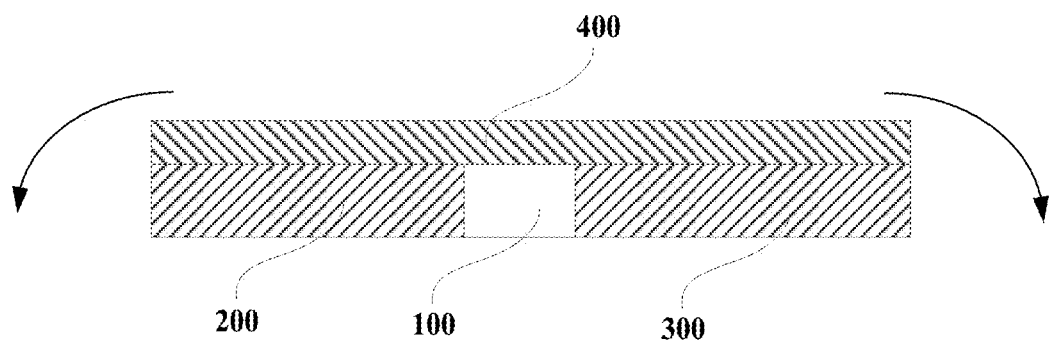
FIG. 7A is a schematic diagram of a structure of an outward folding electronic device in a flattened state.
Figure 7B:
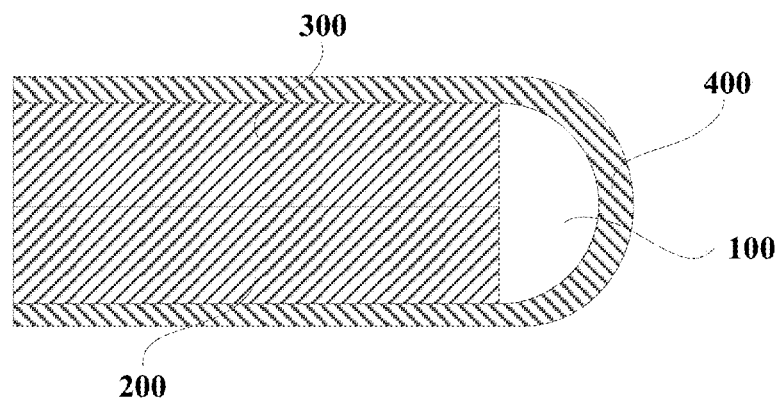
FIG. 7B is a schematic diagram of a structure of an outward folding electronic device in a closed state.

As described above, the electronic device may switch between the flattened state and the closed state through movement of the rotating shaft mechanism 100, and the flexible display 400 may be folded or unfolded with the first housing 200 and the second housing 300. Usually, folding manners of the foldable electronic device include an outward folding manner and an inward folding manner. The outward folding manner means that in a process in which the electronic device switches from the flattened state to the closed state, when the electronic device is in the closed state, the flexible display 400 is located on an outer side of the electronic device. That is, the flexible display 400 is still visible to the user in a folding process and in the closed state, and the user may further perform some operations on the flexible display 400 in the closed state. As described above, the first surface 201 of the first housing 200 and the second surface 301 of the second housing 300 may move away from each other. When the first housing 200 and the second housing 300 are in the closed state, the first surface 201 of the first housing 200 and the second surface 301 of the second housing 300 are away from each other. FIG. 7A is a schematic diagram of a structure of an outward folding electronic device in a flattened state, and FIG. 7B is a schematic diagram of a structure of an outward folding electronic device in a closed state. When the electronic device is in the closed state, the flexible display 400 is located on the outer side of the electronic device. It may be understood that, if no adjustment is performed, in a folding process (namely, a process from FIG. 7A to FIG. 7B) of the outward folding electronic device, a rotation radius of the flexible display 400 is greater than a rotation radius of the rotating shaft mechanism 100. This results in overstretching of the flexible display 400. Therefore, in a design of an outward folding rotating shaft mechanism 100, it is necessary to consider how to avoid or minimize such stretching as much as possible.

Figure 8A:
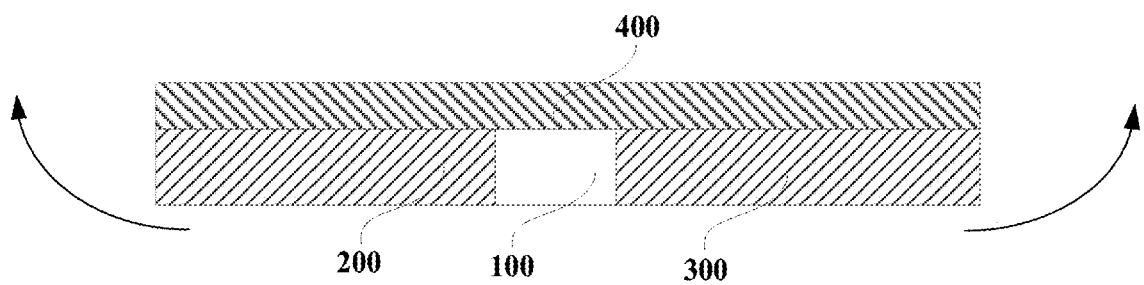
FIG. 8A is a schematic diagram of a structure of an inward folding electronic device in a flattened state.
Figure 8B:
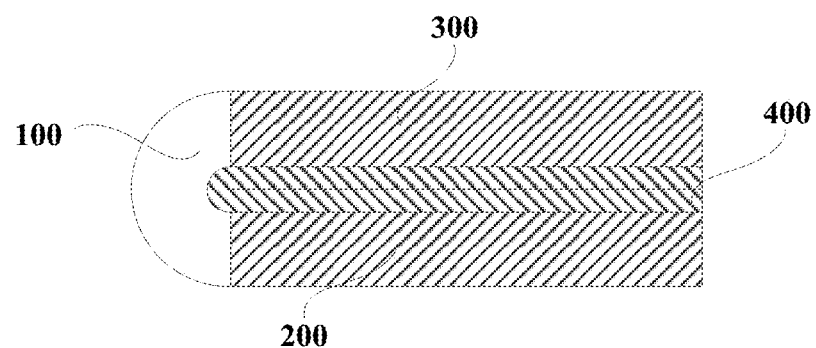
FIG. 8B is a schematic diagram of a structure of an inward folding electronic device in a closed state.

In contrast, the inward folding manner means that in a process in which the electronic device switches from the flattened state to the closed state, when the electronic device is in the closed state, the flexible display 400 is located on an inner side of the electronic device. That is, the flexible display 400 is gradually invisible to the user in the folding process until the flexible display 400 is accommodated between the two housings to be completely hidden in the closed state. As described above, the first surface 201 of the first housing 200 and the second surface 301 of the second housing 300 may move toward each other. When the first housing 200 and the second housing 300 are in the closed state, the first surface 2001 of the first housing 200 and the second surface 3001 of the second housing 300 face each other. FIG. 8A is a schematic diagram of a structure of an inward folding electronic device in a flattened state, and FIG. 8B is a schematic diagram of a structure of an inward folding electronic device in a closed state. When the electronic device is in the closed state, the flexible display 400 is located on the inner side of the electronic device. It may be understood that, in a folding process (namely, a process from FIG. 8A to FIG. 8B) of the inward folding electronic device, the flexible display 400 is folded in half. However, a maximum bending degree that the flexible display 400 can bear is limited. Therefore, there is a corresponding critical curvature radius R (or a critical curvature radius range). Provided that a curvature radius at a bent position of the flexible display 400 is less than the critical curvature radius R, the flexible display 400 is highly prone to be broken and can no longer be used. In addition, even if the curvature radius at the bent position is greater than the critical curvature radius, if a curvature radius of the rotating shaft mechanism 100 of the electronic device is excessively small, problems such as wrinkles, creases, and internal layer dislocation of the flexible display are caused. Therefore, in a design of the rotating shaft mechanism 100 of the inward folding electronic device, the curvature radius at the bent position of the flexible display 400 needs to be maximized, thereby reducing squeezing on the flexible display 400.

It is easy to understand that increasing a spacing distance between two housings in the folded state may increase the curvature radius such that the flexible display 400 is not directly folded in half. A larger spacing distance between the two housings indicates a larger curvature radius of the bent position of the flexible display 400 and smaller squeezing on the flexible display 400. A smaller spacing distance between the two housings indicates a smaller curvature radius of the bent position of the flexible display 400, larger squeezing on the flexible display 400, and more obvious creases. In addition, a larger spacing between the two housings indicates a larger thickness of the electronic device in the folded state. This affects portability of the electronic device. In addition, dust, foreign matter, and the like may enter the spacing, to damage and abrade the flexible display. This affects a service life of the flexible display, and also affects a service life of the rotating shaft mechanism.

Based on the foregoing problems of the inward folding foldable electronic device, an embodiment of this application provides a foldable electronic device and a rotating shaft mechanism applicable to the electronic device, to improve portability of the electronic device and also provide a large accommodating space for the flexible display 400 in a folding process and in a closed state. This increases the curvature radius at the bent position of the flexible display 400, and reduces a risk of the flexible display 400 being squeezed and damaged.

The following first briefly describes main components and related mechanisms that may be related to the rotating shaft mechanism 100 provided in this application, and the following further describes a specific structure and an implementation principle of each part in detail.

Figure 9A:
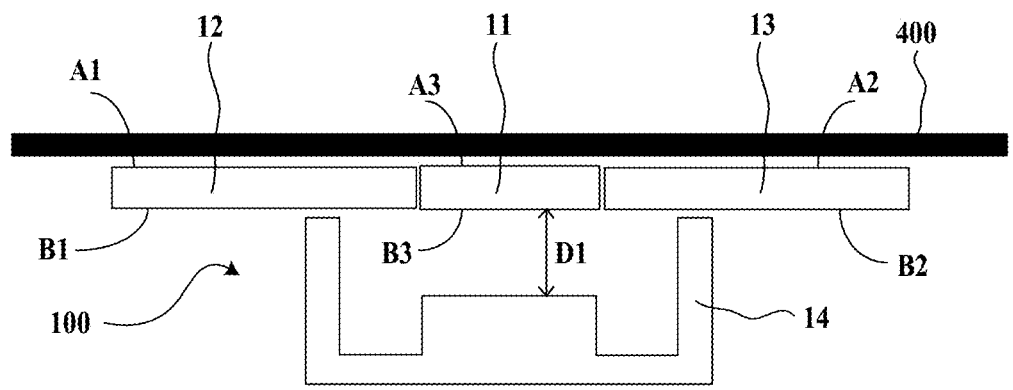
FIG. 9A is a state diagram of a flexible display and a rotating shaft mechanism when an electronic device is in a flattened state according to an embodiment of this application.
Figure 9B:
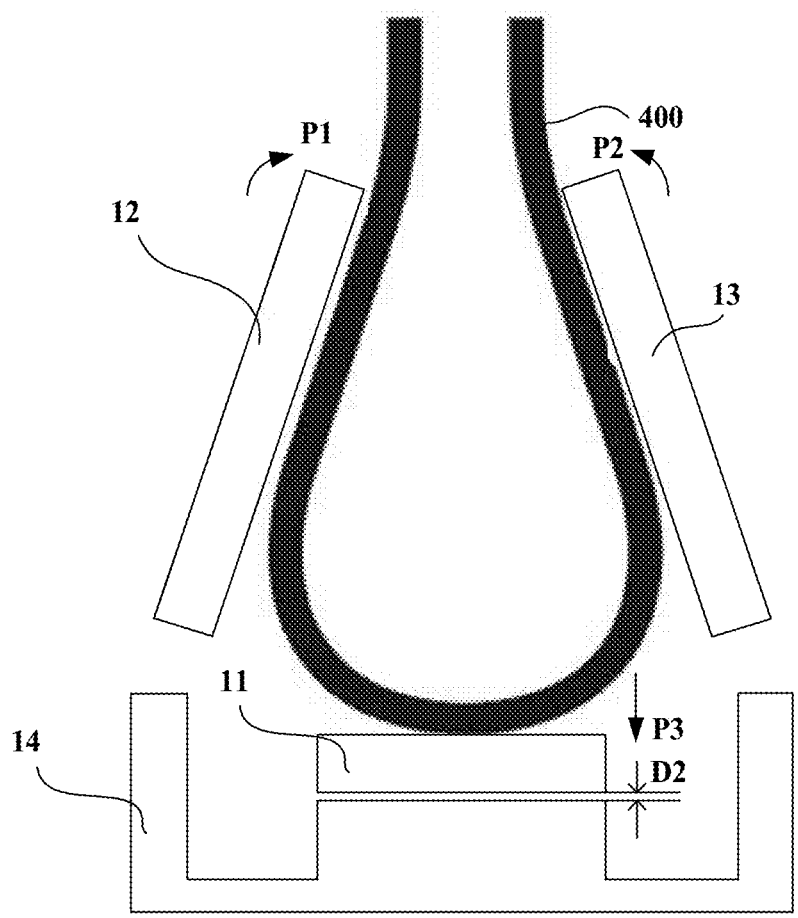
FIG. 9B is a state diagram of a flexible display and a rotating shaft mechanism when an electronic device is in a closed state according to an embodiment of this application.

FIG. 9A and FIG. 9B are simple schematic diagrams of the rotating shaft mechanism 100 in two different states according to this application. FIG. 9A is a state diagram of the flexible display 400 and the rotating shaft mechanism 100 when the electronic device is in the flattened state, and FIG. 9B is a state diagram of the flexible display 400 and the rotating shaft mechanism 100 when the electronic device is in the closed state.

Refer to FIG. 9A and FIG. 9B. The rotating shaft mechanism 100 provided in this application includes a first door plate 12, a second door plate 13, and an intermediate door plate 11. The first door plate 12 and the second door plate 13 are arranged on two opposite sides of the intermediate door plate 11, that is, the intermediate door plate 11 is clamped between the first door plate 12 and the second door plate 13. The rotating shaft mechanism 100 further includes a body 14, and the first door plate 12, the intermediate door plate 11, and the second door plate 13 are located on a same side of the body 14. It may be understood in this way that, as shown in FIG. 9A, the first door plate 12 has a surface A1 and a surface B1 that are opposite to each other, the second door plate 13 has a surface A2 and a surface B2 that are opposite to each other, and the intermediate door plate 11 has a surface A3 and a surface B3 that are opposite to each other. The surface A1, the surface A2, and the surface A3 are on a same side, and the surface B1, the surface B2, and the surface B3 are on a same side. If the body 14 is disposed on the side of the surface B 1, the surface B2, and the surface B3, the flexible display 400 is disposed on the side of the surface A1, the surface A2, and the surface A3.

In the rotating shaft mechanism 100 provided in this application, the first door plate 12 can rotate relative to the body 14, the second door plate 13 can also rotate relative to the body 14, and a rotating direction of the first door plate 12 is opposite to a rotating direction of the second door plate 13. The first door plate 12 and the second door plate 13 that rotate opposite to each other may include two states. In the first state, when the electronic device is folded, the first door plate 12 and the second door plate 13 rotate toward each other (or referred to as relative to each other). In the second state, when the electronic device is unfolded, the first door plate 12 and the second door plate 13 rotate away from each other.

In addition, in the rotating shaft mechanism 100 provided in this application, in a rotating process of the first door plate 12 and the second door plate 13, the intermediate door plate 11 can move in a direction close to the body 14, or move in a direction away from the body 14.

Refer to FIG. 4 and FIG. 9A. The flexible display 400 consecutively covers the first housing 200, the rotating shaft mechanism 100, and the second housing 300 of the foldable electronic device. A region A corresponds to the first surface 2001 of the first housing 200, and may be fixedly connected to the first surface 201 of the first housing 200. A region E corresponds to the second surface 301 of the second housing 300, and may be fixedly connected to the second surface 3001 of the second housing 300. A region B is fixedly connected to the first door plate 12 of the rotating shaft mechanism, a region D is fixedly connected to the second door plate 13 of the rotating shaft mechanism, a region C is relative to the intermediate door plate 11, and the region C can move relative to the intermediate door plate 11.

As shown in FIG. 9A, when the electronic device is in the flattened state, the first door plate 12, the intermediate door plate 11, and the second door plate 13 are in a same plane, and are configured to support the flattened flexible display 400. When the electronic device switches from the flattened state to the closed state, as shown in FIG. 9A and FIG. 9B, the first door plate 12 rotates relative to the body 14 along a rotating direction P1, and the second door plate 13 rotates relative to the body 14 along a direction P2 that is opposite to the direction P1. That is, ends of the first door plate 12 and the second door plate 13 that are away from the body 14 are close to each other, and ends of the first door plate 12 and the second door plate 13 that are close to the body 14 are away from each other such that the flexible display 400 bends between the first door plate 12 and the second door plate 13. In addition, in a process in which the first door plate 12 and the second door plate 13 are close to each other relative to the body 14, the intermediate door plate 11 moves close to the body 14 along a direction P3 shown in FIG. 9B. For example, a distance between the intermediate door plate 11 and the body 14 may be reduced from D1 in FIG. 9A to D2 in FIG. 9B. Therefore, the first door plate 12, the intermediate door plate 11, and the second door plate 13 form an accommodating cavity close to a triangle. The flexible display 400 is accommodated in the triangular accommodating cavity, and may be in a shape similar to a water drop. It may be understood in this way that, the intermediate door plate 11 moves toward the body 14, so that a sufficient accommodating space may be avoided for the flexible display 400, to increase the curvature radius at the bent position of the flexible display 400, and reduce a risk of the flexible display 400 being squeezed and damaged.

In contrast, when the electronic device switches from the closed state to the flattened state, as shown in FIG. 9B and FIG. 9A, the first door plate 12 rotates relative to the body 14 along a direction opposite to the rotating direction P1, and the second door plate 13 rotates relative to the body 14 along a direction opposite to the direction P2. That is, the first door plate 12 and the second door plate 13 are away from each other such that the flexible display 400 is unfolded. In a process in which the ends of the first door plate 12 and the second door plate 13 are away from each other relative to the body 14, the intermediate door plate 11 moves away from the body 14 along a direction opposite to a direction P3 shown in FIG. 9B, until the first door plate 12, the intermediate door plate 11, and the second door plate 13 move to be in the same plane, to support the flattened flexible display 400.

Based on the foregoing descriptions of the structure of the rotating shaft mechanism 100 provided in this application and the descriptions of the movement relationship between the structures in the rotating shaft mechanism 100, it may be learned that, in the rotating shaft mechanism 100 provided in this application, not only the first door plate 12 and the second door plate 13 may rotate relative to the body 14, but also the intermediate door plate 11 may ascend or descend relative to the body 14, so that a length of the rotating shaft mechanism 100 can change. That is, when the flexible display 400 is folded, the length of the rotating shaft mechanism 100 can be extended, to avoid more accommodating spaces for the flexible display 400, and the curvature radius at the bent position of the flexible display 400 is increased. This avoids squeezing on a part that is of the flexible display 400 and that is close to the rotating shaft mechanism 100. When the flexible display 400 is unfolded, the length of the rotating shaft mechanism 100 can be shortened. In other words, the rotating shaft mechanism 100 may enable the flexible display 400 to be at any angle in the folding process, and a length size of the flexible display 400 basically remains unchanged, that is, the flexible display 400 is not squeezed or stretched.

Figure 10:
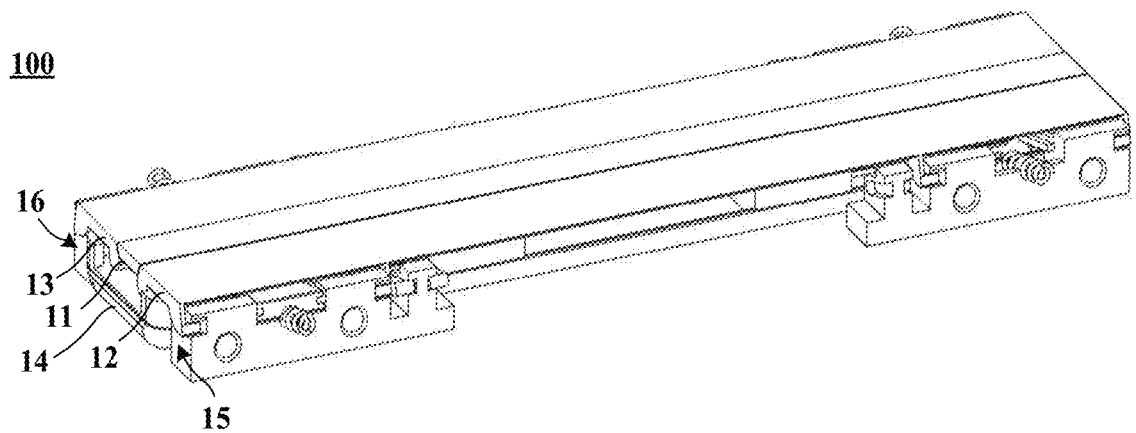
FIG. 10 is a diagram of a structure of a rotating shaft mechanism when an electronic device is in a flattened state according to an embodiment of this application.
Figure 11:
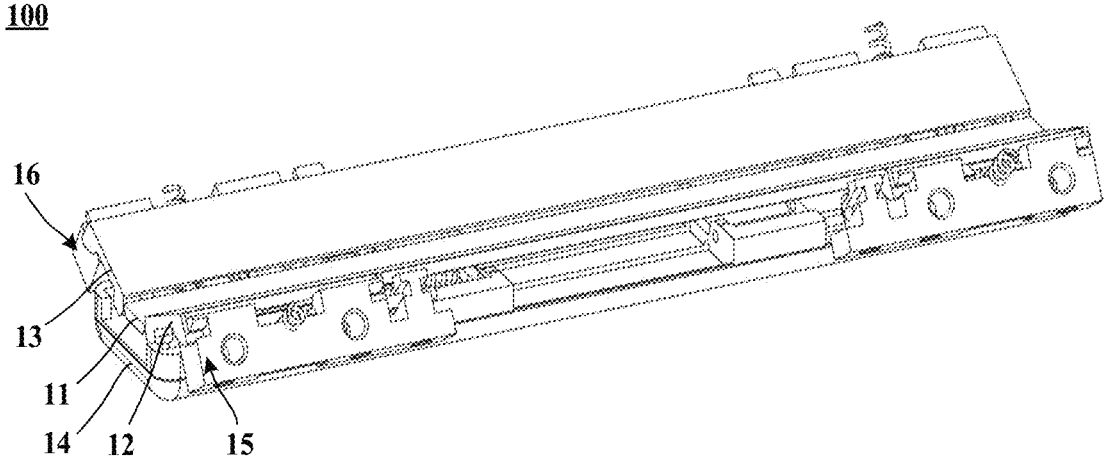
FIG. 11 is a diagram of a structure of a rotating shaft mechanism when an electronic device is in a closed state according to an embodiment of this application.

FIG. 10 and FIG. 11 show implementable structures of a rotating shaft mechanism 100. FIG. 10 is a diagram of a structure of a rotating shaft mechanism 100 when an electronic device is in a flattened state, and FIG. 11 is a diagram of a structure of a rotating shaft mechanism 100 when an electronic device is in a closed state. With reference to FIG. 10 and FIG. 11, in addition to the first door plate 12, the second door plate 13, the intermediate door plate 11, and the body 14, the rotating shaft mechanism 100 further includes a first connecting rod assembly 15 and a second connecting rod assembly 16. The first connecting rod assembly 15 and the second connecting rod assembly 16 are disposed opposite to each other on two sides of the body 14, that is, the first connecting rod assembly 15 is disposed close to the first door plate 12, and the second connecting rod assembly 16 is disposed close to the second door plate 13.

Figure 12:
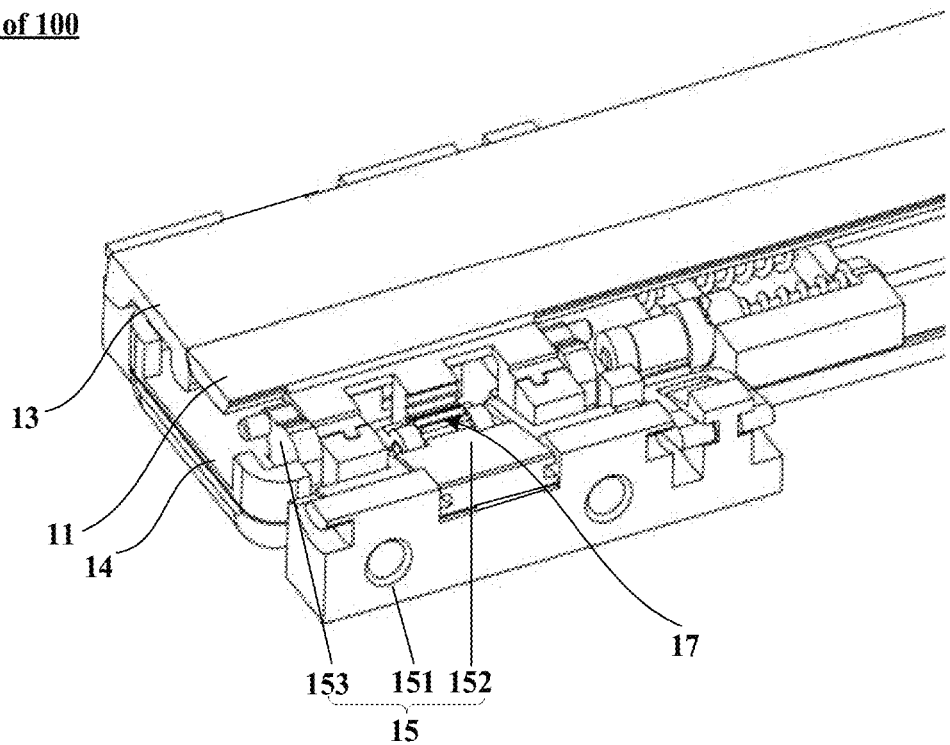
FIG. 12 is a diagram of a partial structure of a rotating shaft mechanism from which a first door plate is removed according to an embodiment of this application.

FIG. 12 is a diagram of a partial structure of a rotating shaft mechanism 100 from which a first door plate 12 is removed. With reference to FIG. 12, the first connecting rod assembly 15 includes a first housing connecting rod 151, a first gear connecting rod 152, and a first secondary connecting rod 153. In addition, the rotating shaft mechanism 100 further includes a first meshing transmission structure 17.

Figure 13:
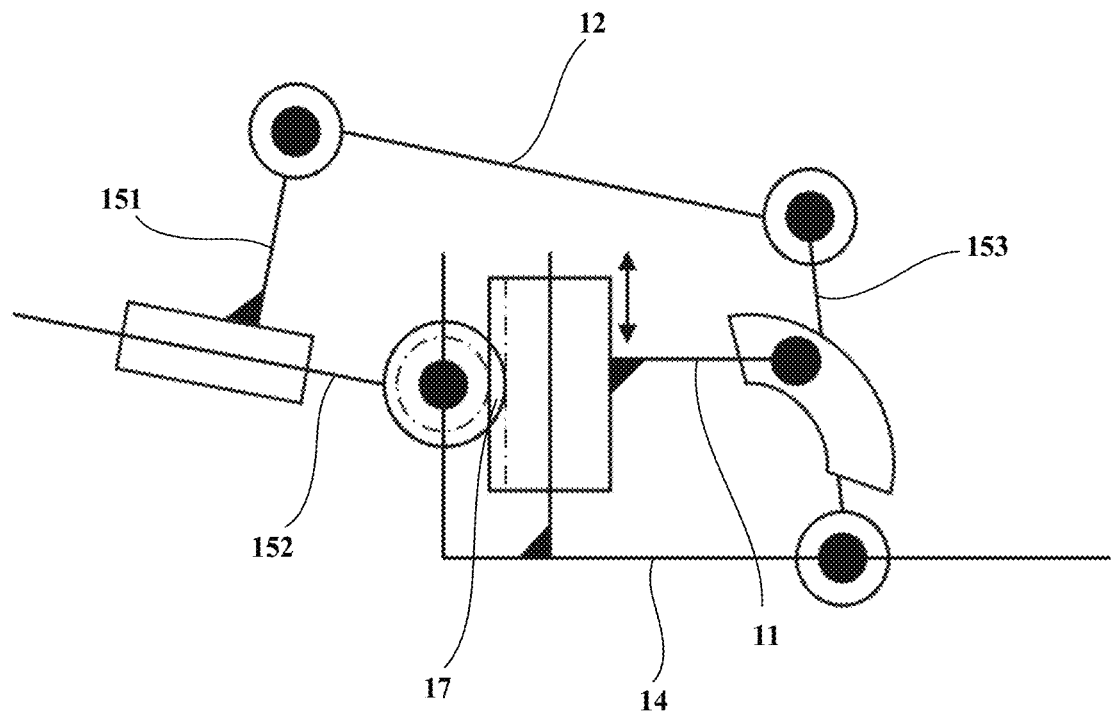
FIG. 13 is a simple schematic diagram of a connection relationship between a first housing connecting rod, a first gear connecting rod, a first secondary connecting rod, a first meshing transmission structure, a body, a first door plate, and an intermediate door plate according to an embodiment of this application.

FIG. 13 is a simple schematic diagram of a connection relationship between a first housing connecting rod 151, a first gear connecting rod 152, a first secondary connecting rod 153, a first meshing transmission structure 17, a body 14, a first door plate 12, and an intermediate door plate 11. One end that is of the first gear connecting rod 152 and that is close to the body 14 is rotatably connected to the body 14, one end that is of the first gear connecting rod 152 and that is away from the body 14 is slidably connected to the first housing connecting rod 151, one end that is of the first gear connecting rod 152 and that is close to the intermediate door plate 11 is connected to the intermediate door plate 11 in a meshed manner through the first meshing transmission structure 17, one end of the first door plate 12 is rotatably connected to the first housing connecting rod 151, the other end of the first door plate 12 is rotatably connected to one end of the first secondary connecting rod 153, the other end of the first secondary connecting rod 153 is rotatably connected to the body 14, and the first secondary connecting rod 153 is slidably connected to the intermediate door plate 11.

As shown in FIG. 13, when the first gear connecting rod 152 rotates relative to the body 14, under a mechanical linkage action of the first housing connecting rod 151, the first secondary connecting rod 153, the first gear connecting rod 152, and the first meshing transmission structure 17, the first door plate 12 is driven to rotate relative to the body 14, and the intermediate door plate 11 is driven to move relative to the body 14. This implements extension and contraction of the rotating shaft mechanism 100.

Figure 14:
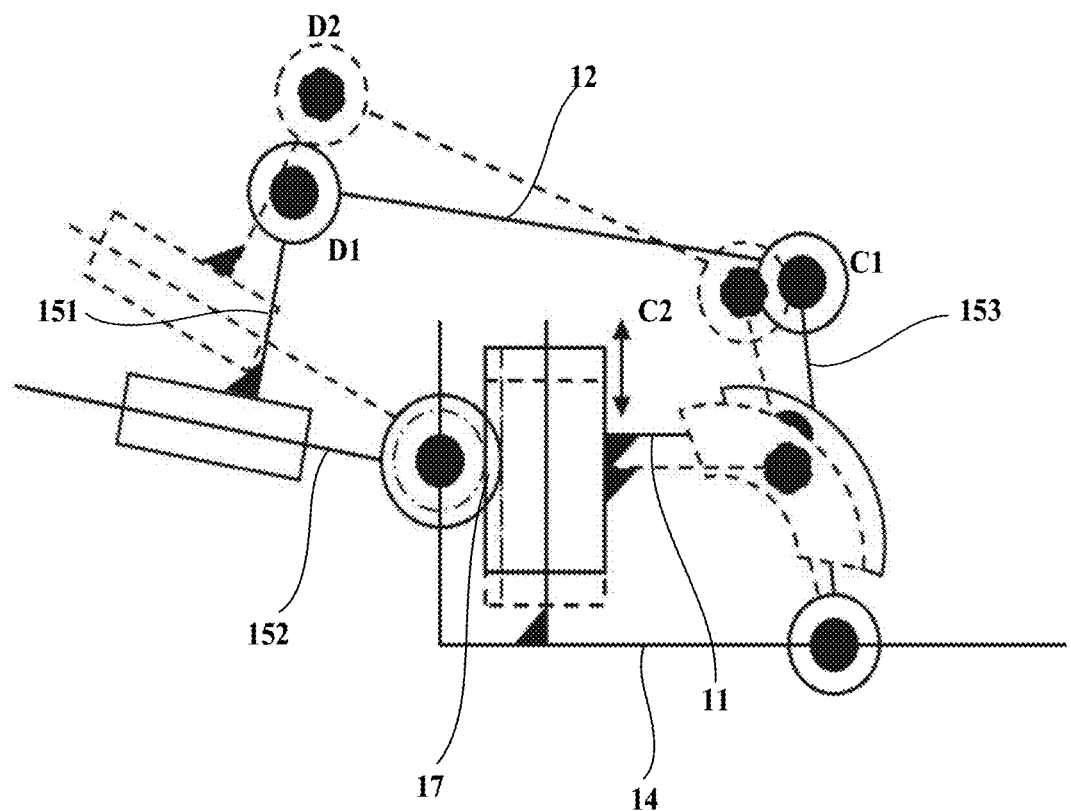
FIG. 14 is a diagram of a usage state of a connection relationship between a first housing connecting rod, a first gear connecting rod, a first secondary connecting rod, a first meshing transmission structure, a body, a first door plate, and an intermediate door plate according to an embodiment of this application.

FIG. 14 shows positions of the first gear connecting rod 152, the first housing connecting rod 151, the first secondary connecting rod 153, the first door plate 12, and the intermediate door plate 11 when the electronic device is folded and when the rotating shaft mechanism 100 is in two different states. Black solid lines indicate positions of the first gear connecting rod 152, the first housing connecting rod 151, the first secondary connecting rod 153, the first door plate 12, and the intermediate door plate 11, and black dashed lines indicate other positions of the first gear connecting rod 152, the first housing connecting rod 151, the first secondary connecting rod 153, the first door plate 12, and the intermediate door plate 11.

It can be learned from FIG. 14 that, because the first secondary connecting rod 153 is slidably connected to the intermediate door plate 11, two ends of the first secondary connecting rod 153 are further rotatably connected to the first door plate 12 and the body 14. In this way, a movement position of one end that is of the first door plate 12 and that is close to the body 14 may be restricted through the slidable connection. For example, as shown in FIG. 14, when the electronic device is folded, the intermediate door plate 11 sinks relative to the body 14 (that is, moves from a position of the black solid line to a position of the black dashed line), and drives the first secondary connecting rod 153 to rotate, one end that is of the first door plate 12 and that is close to the body 14 may be restricted to rotate from a position C1 to a position C2.

In addition, as shown in FIG. 14, one end of the first housing connecting rod 151 is rotatably connected to the first door plate 12, and the other end is slidably connected to the first gear connecting rod 152, so that a movement position of one end that is of the first door plate 12 and that is away from the body 14 may be controlled. For example, when the electronic device is folded, the intermediate door plate 11 sinks relative to the body 14 (that is, moves from the position of the black solid line to the position of the black dashed line). One end that is of the first door plate 12 and that is away from the body 14 may be restricted to rotate from a position D1 to a position D2. In other words, a movement position of the first door plate 12 may be accurately controlled through a mechanical linkage mechanism formed by the first gear connecting rod 152, the first housing connecting rod 151, the first secondary connecting rod 153, the first door plate 12, the intermediate door plate 11, and the body 14.

Still with reference to FIG. 14, because the first secondary connecting rod 153 is slidably connected to the intermediate door plate 11, and the first secondary connecting rod 153 is further rotatably connected to the first door plate 12, in such a design, a movement position of the intermediate door plate 11 may be associated with a rotating position of the first door plate 12, so that a length change status of the rotating shaft mechanism 100 may be accurately controlled. For example, when the electronic device is folded, a size of a formed display accommodating space may be accurately controlled, to reserve a proper space for the flexible display.

In addition, as shown in FIG. 13 and FIG. 14, one end that is of the first gear connecting rod 152 and that is close to the intermediate door plate 11 is connected to the intermediate door plate 11 in the meshed manner through the first meshing transmission structure 17. In other words, when the first gear connecting rod 152 rotates relative to the body 14, the intermediate door plate 11 may be driven to move relative to the body 14 by using the first meshing transmission structure 17.

The foregoing technical means of implementing movement of the intermediate door plate 11 by using the meshing transmission structure may reduce movement resistance of the intermediate door plate 11, improve movement stability of the intermediate door plate 11, and further improve movement precision of the intermediate door plate 11 compared with using friction transmission. In addition, when the first gear connecting rod 152 rotates relative to the body 14, the intermediate door plate 11 can quickly respond, that is, quickly move relative to the body 14. Further, by using the meshing transmission structure, reliability of using the rotating shaft mechanism 100 is not quickly reduced because the electronic device is folded for a plurality of times. Therefore, using the meshing transmission structure to drive the intermediate door plate 11 to move can effectively improve use performance of the electronic device.

Figure 15:
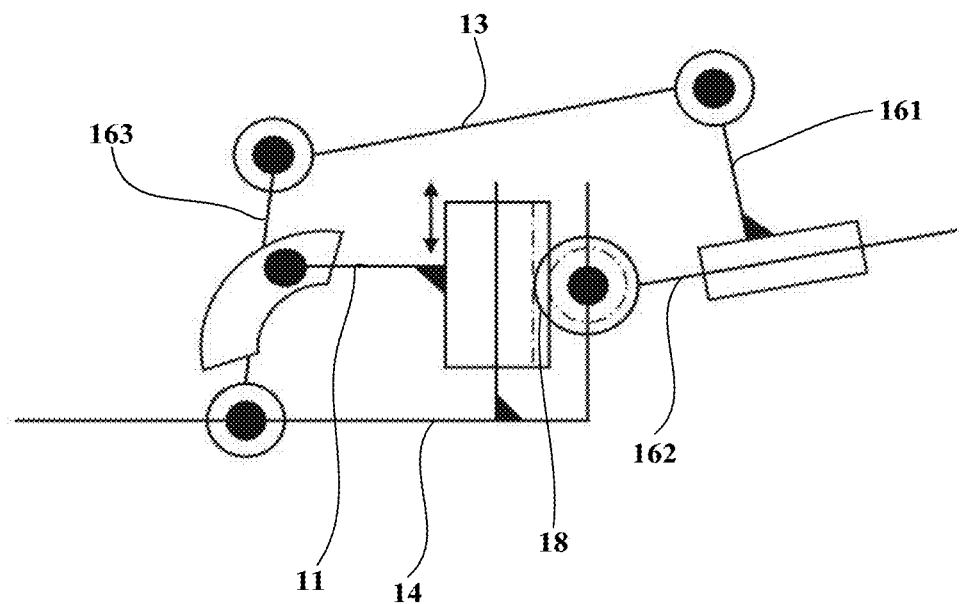
FIG. 15 is a simple schematic diagram of a connection relationship between a second housing connecting rod, a second gear connecting rod, a second secondary connecting rod, a second meshing transmission structure, a body, a second door plate, and an intermediate door plate according to an embodiment of this application.

FIG. 15 shows a structure of a second connecting rod assembly 16. Specifically, the second connecting rod assembly 16 disposed close to the second door plate 13 also includes a second housing connecting rod 161, a second gear connecting rod 162, and a second secondary connecting rod 163. In addition, the rotating shaft mechanism 100 further includes a second meshing transmission structure 18.

Similar to the first connecting rod assembly 15, in the second connecting rod assembly 16, one end that is of the second gear connecting rod 162 and that is close to the body 14 is rotatably connected to the body 14, one end that is of the second gear connecting rod 162 and that is away from the body 14 is slidably connected to the second housing connecting rod 161, one end that is of the second gear connecting rod 162 and that is close to the intermediate door plate 11 is connected to the intermediate door plate 11 in the meshed manner through the second meshing transmission structure 18, one end of the second door plate 13 is rotatably connected to the second housing connecting rod 161, the other end of the second door plate 13 is rotatably connected to one end of the second secondary connecting rod 163, the other end of the second secondary connecting rod 163 is rotatably connected to the body 14, and the second secondary connecting rod 163 is slidably connected to the intermediate door plate 11.

Figure 16:
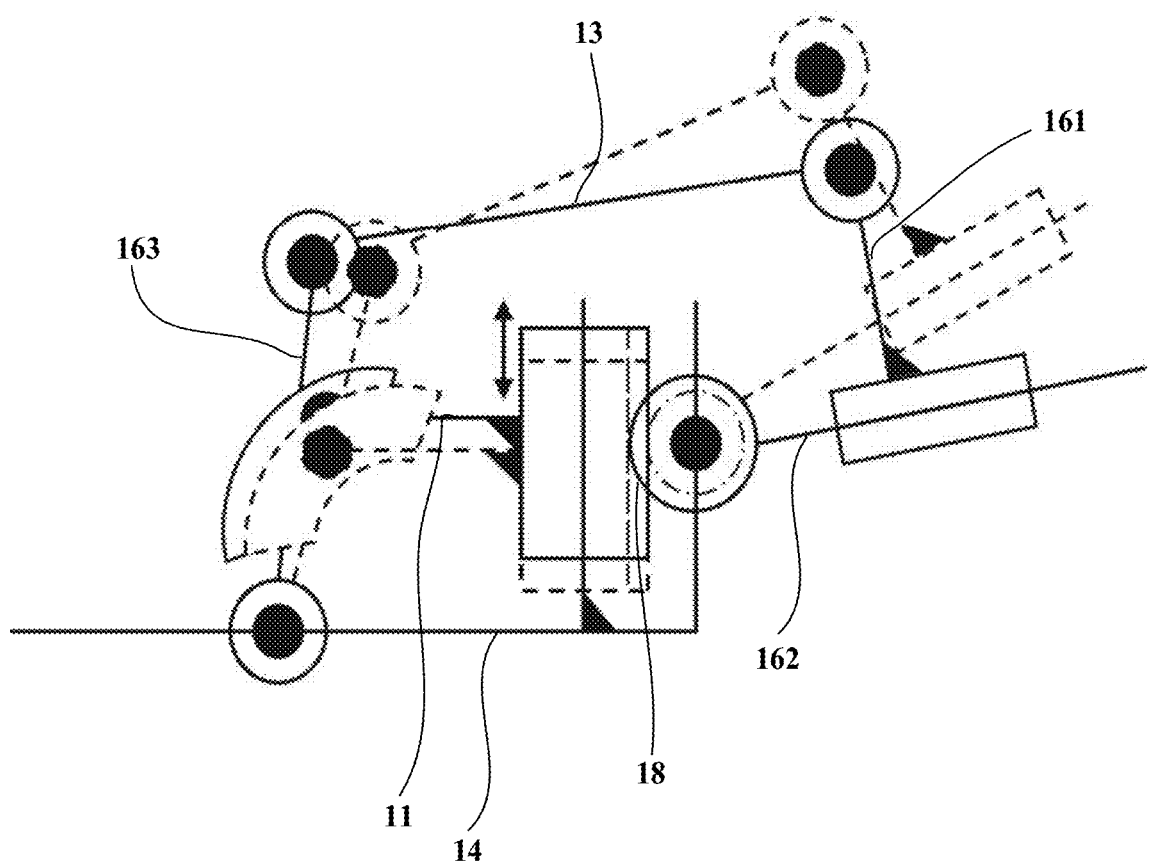
FIG. 16 is a diagram of a usage state of a connection relationship between a second housing connecting rod, a second gear connecting rod, a second secondary connecting rod, a second meshing transmission structure, a body, a second door plate, and an intermediate door plate according to an embodiment of this application.

FIG. 16 shows positions of the second gear connecting rod 162, the second housing connecting rod 161, the second secondary connecting rod 163, the second door plate 13, and the intermediate door plate 11 when the electronic device is folded and when the rotating shaft mechanism 100 is in two different states. A mechanism in which the second connecting rod assembly 16 and the second meshing transmission structure 18 drive the second door plate 13 to rotate and drive the intermediate door plate 11 to move is the same as a mechanism in which the first connecting rod assembly 15 and the first meshing transmission structure 17 drive the first door plate 12 to rotate and drive the intermediate door plate 11 to move shown in FIG. 14. Details are not described herein again.

In some implementations, to improve balance of the first door plate 12 and the second door plate 13 rotating relative to the body 14, the first connecting rod assembly 15 and the second connecting rod assembly 16 may be symmetrically arranged with respect to the body 14, and the first meshing transmission structure 17 and the second meshing transmission structure 18 may be symmetrically arranged with respect to the body 14.

Similarly, to make symmetry and balance of the first door plate 12 and the second door plate 13 rotating relative to the body 14, a rotation axis of the first gear connecting rod 152 rotating relative to the body 14 may be parallel to a rotation axis of the second gear connecting rod 162 rotating relative to the body 14, and a rotation axis of the first door plate 12 rotating relative to the first housing connecting rod 151 may be parallel to a rotation axis of the second door plate 13 rotating relative to the second housing connecting rod 152.

Figure 17:
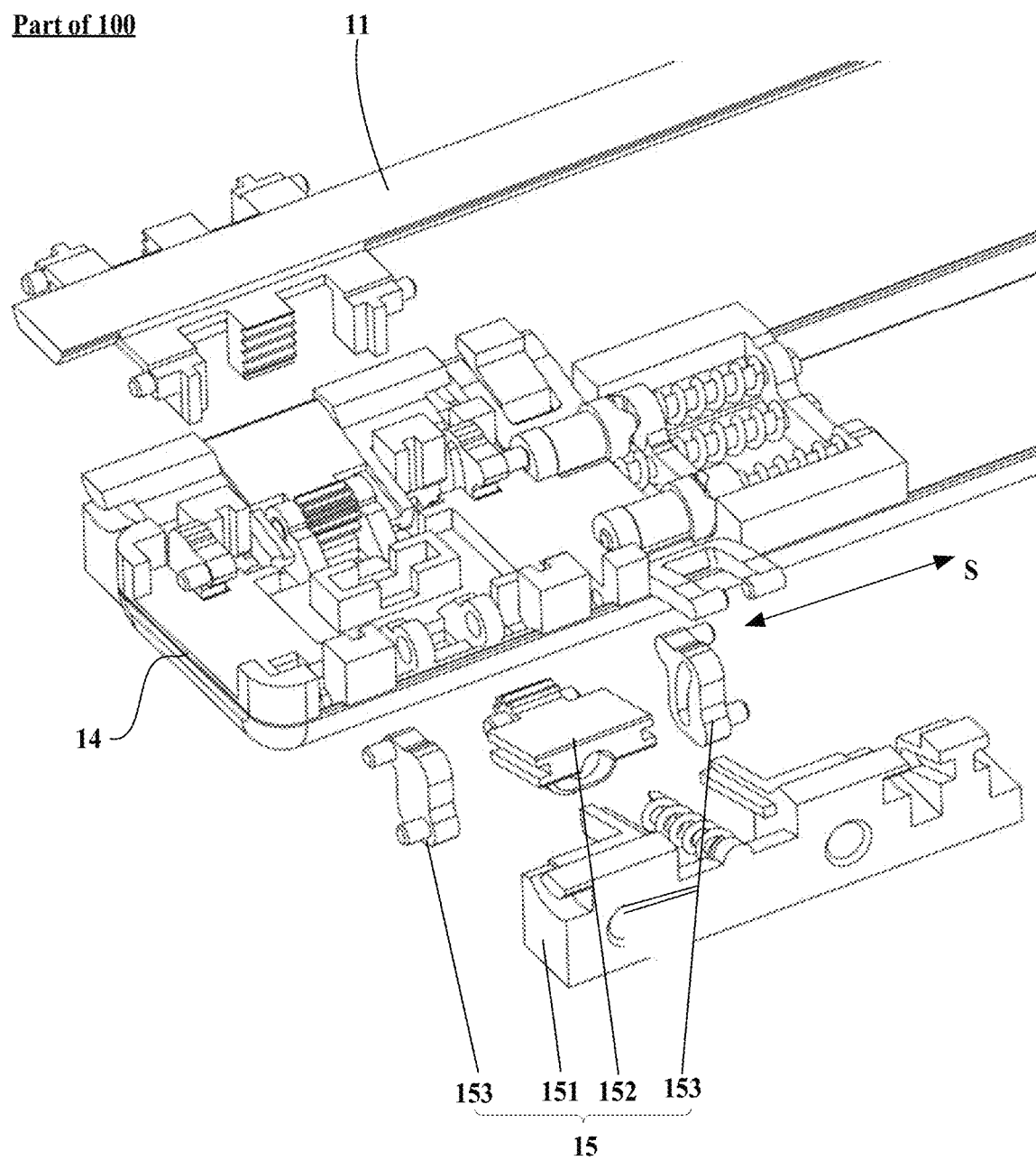
FIG. 17 is an exploded diagram of a partial structure of a rotating shaft mechanism according to an embodiment of this application.

In some designs, one or more first housing connecting rods 151 may be included, and one or more first gear connecting rods 152 may also be included. In an implementation of this application, FIG. 17 is an exploded diagram of a partial structure of a rotating shaft mechanism 100. In the embodiment shown in FIG. 17, a rotating shaft mechanism 100 including one first housing connecting rod 151 and one first gear connecting rod 152 is provided. In another implementation, when there is one first housing connecting rod 151, and there are a plurality of first gear connecting rods 152, a plurality of first gear connecting rods 152 may be slidably connected to one first housing connecting rod 151; or when there are a plurality of first housing connecting rods 151, and there are a plurality of first gear connecting rods 152, the plurality of first housing connecting rods 151 may be slidably connected to the plurality of first gear connecting rods 152 in a one-to-one manner.

For a quantity of the second housing connecting rod 161 in the second gear connecting rod 162 in the second connecting rod assembly 16 and a manner of disposing the second housing connecting rod 161 and the second gear connecting rod 162 in the second connecting rod assembly 16, refer to related descriptions of the first housing connecting rod 151 and the first gear connecting rod 152. Details are not described herein again.

In some embodiments, one or more first secondary connecting rods 153 may be included. In this embodiment of this application, as shown in FIG. 17, there are two first secondary connecting rods 153, and the two first secondary connecting rods 153 may be disposed at intervals along a length direction (for example, a direction S in FIG. 17) of the body 14.

For a quantity of the second secondary connecting rod 163 and a manner of disposing the second secondary connecting rod 163, refer to related descriptions of the first secondary connecting rod 153. Details are not described herein again.

The following describes an implementable structure of the first meshing transmission structure 17. For an implementable structure of the second meshing transmission structure 18, refer to descriptions of the first meshing transmission structure 17. In some implementations, the implementable structure of the second meshing transmission structure 18 may be the same as or different from the first meshing transmission structure 17.

The first meshing transmission structure 17 has a plurality of optional implementations. The following provides at least two different first meshing transmission structures 17.

Figure 18:
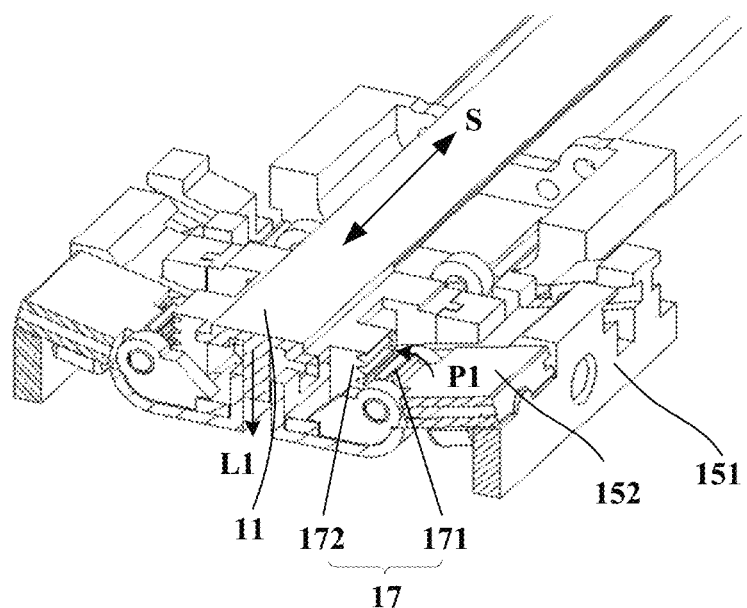
FIG. 18 is a diagram of a partial structure of a rotating shaft mechanism according to an embodiment of this application.

FIG. 18 shows an implementable structure of a first meshing transmission structure 17, and FIG. 18 is a sectional view of a partial structure of a rotating shaft mechanism 100. As shown in FIG. 18, the first meshing transmission structure 17 includes a first gear 171 and a first rack 172 meshed with the first gear 171. The first gear 171 is disposed at one end that is of the first gear connecting rod 152 and that is close to the intermediate door plate 11, and the first rack 172 is formed on the intermediate door plate 11.

With reference to FIG. 18, a rotation axis of the first gear 171 is parallel to a rotation axis of the first gear connecting rod 152. For example, both the first gear 171 and the first gear connecting rod 152 may extend along a length direction (for example, a direction S in FIG. 18) of the intermediate door plate 11. An extension direction of the first rack 172 may be perpendicular to the intermediate door plate 11, that is, perpendicular to the length direction S of the intermediate door plate 11.

Based on the foregoing description of the first meshing transmission structure 17 shown in FIG. 18, a working process in which the first meshing transmission structure 17 drives the intermediate door plate 11 to move is as follows: As shown in FIG. 18, in a folding process of the electronic device, when the first gear connecting rod 152 rotates relative to the body 14 along the direction P1, a rotating first gear 171 drives the first rack 172 to move along a direction L1, so that the intermediate door plate 11 moves toward the direction close to the body 14. In contrast, in a process of closing the electronic device, when the first gear connecting rod 152 rotates relative to the body 14 along the direction opposite to the direction P1, the rotating first gear 171 drives the first rack 172 to move in a direction opposite to the direction of L1, so that the intermediate door plate 11 moves toward the direction away from the body 14.

Figure 19:
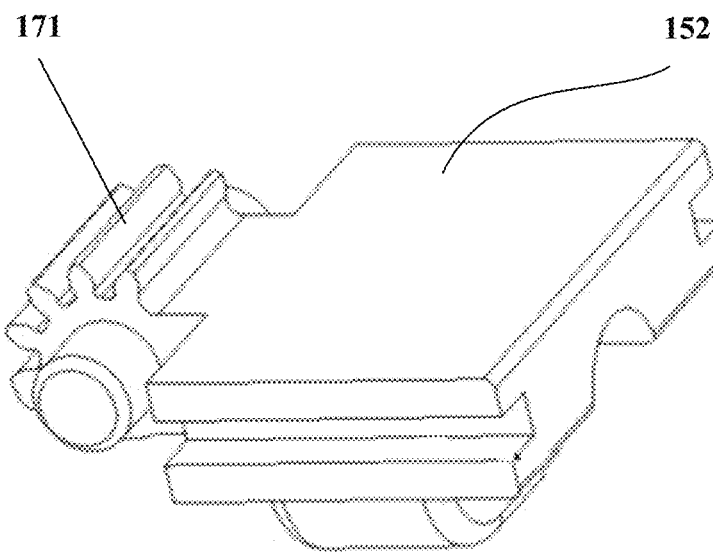
FIG. 19 is a diagram of a structure of a first gear connecting rod according to an embodiment of this application.

FIG. 19 is a diagram of a structure of an implementable structure of a first gear 171. In an optional implementation, as shown in FIG. 19, meshing teeth may be formed at one end that is of the first gear connecting rod 152 and that is close to the intermediate door plate 11, to form the first gear 171. That is, the first gear 171 and the first gear connecting rod 152 are of an integrally formed piece. Alternatively, in another implementation, the first gear 171 is fixedly connected to the first gear connecting rod 152 through a connecting piece (for example, a bolt).

The first gear 171 shown in FIG. 19 is a complete gear structure with a circular cross section. In some other embodiments, the structure may also be a partial structure cut from the complete gear structure shown in FIG. 19.

Figure 20:
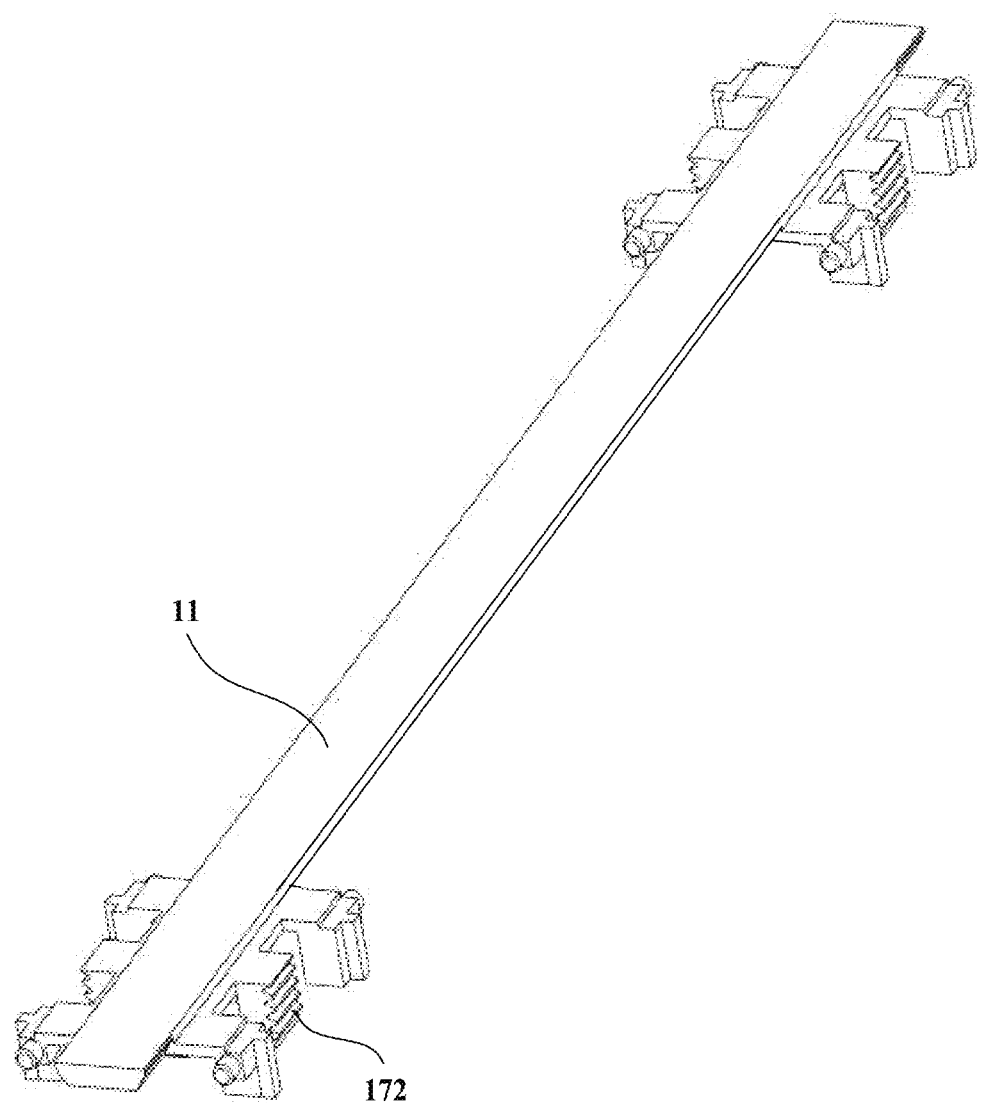
FIG. 20 is a diagram of a structure of an intermediate door plate according to an embodiment of this application.

FIG. 20 is a diagram of a structure of an implementable structure of a first rack 172. In an optional implementation, as shown in FIG. 20, the first rack 172 and the intermediate door plate 11 may be of an integrally formed piece, or may be fixedly connected to the intermediate door plate 11 through the connecting piece (for example, the bolt), or may be fixedly connected to the intermediate door plate 11 by using adhesive.

The first meshing transmission structure 17 may alternatively use the following structure. For example, in addition to the first gear 171 and the first rack 172 shown in FIG. 17, the first meshing transmission structure 17 may further include a first driven gear. In addition, the first gear 171 is externally meshed with the first driven gear, and the first driven gear is further externally meshed with the first rack 172. Alternatively, more gear structures may be further included. For example, a second driven gear may be further included, and the second driven gear and the first driven gear are disposed in a coaxial manner. The first gear 171 is externally meshed with the first driven gear, and the second driven gear is externally meshed with the first rack 172.

The following further describes connection structures between structures of the first door plate 12, the first housing connecting rod 151, the first gear connecting rod 152, the first secondary connecting rod 153, and the body 14.

The slidable connection between the first housing connecting rod 151 and the first gear connecting rod 152 has a plurality of implementation structures. The following provides two different slidable connection structures. Certainly, in addition to the two slidable connection structures, another slidable connection structure may also be used.

Figure 21:
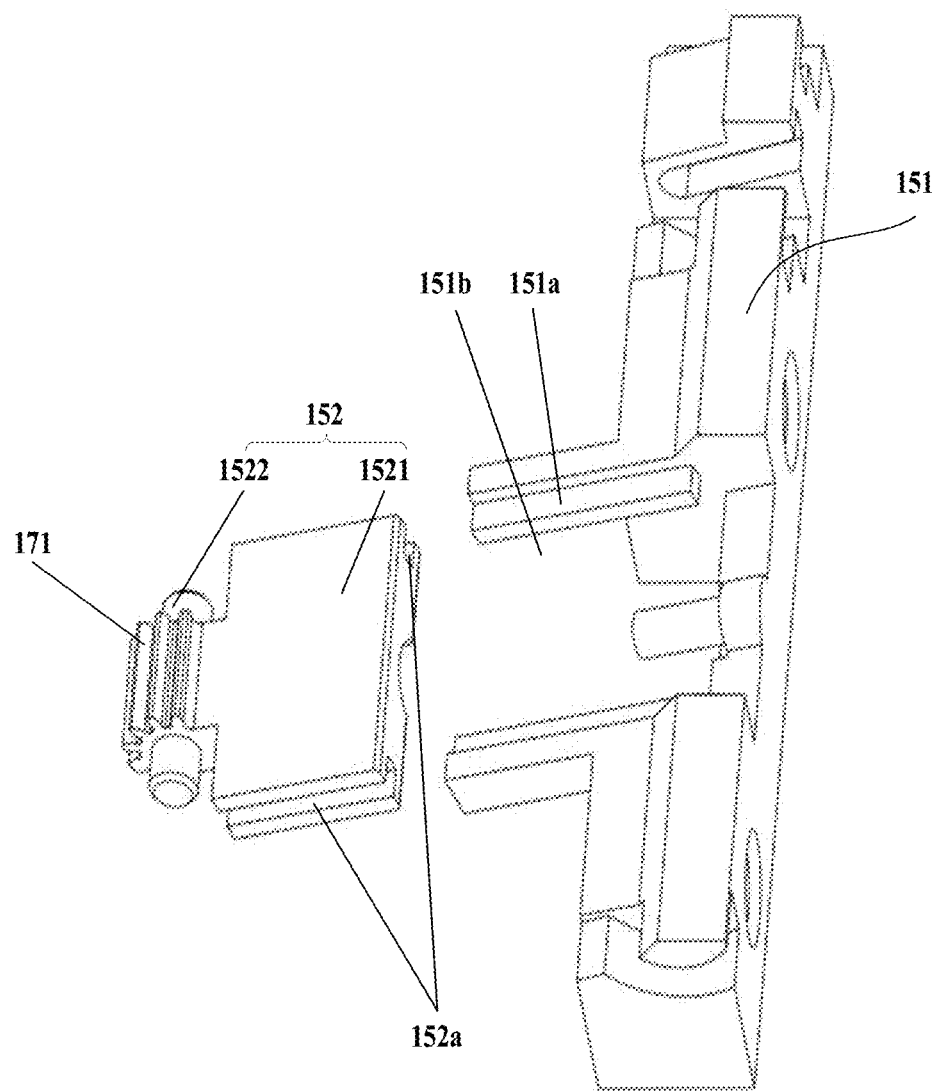
FIG. 21 is an exploded diagram of a first gear connecting rod and a first housing connecting rod according to an embodiment of this application.

Example 1: FIG. 21 shows a slidable connection relationship, and FIG. 21 is an exploded diagram of a first housing connecting rod 151 and a first gear connecting rod 152 that cooperates with a first housing connecting rod 151. In this embodiment of this application, a sliding groove 152*a* is formed on the first gear connecting rod 152, a sliding block 151*a* is formed on the first housing connecting rod 151, and the sliding block 151*a* is assembled in the sliding groove 152*a* and may slide along the sliding groove 152*a*, to implement a slidable connection between the first housing connecting rod 151 and the first gear connecting rod 152.

To improve sliding stability of the first housing connecting rod 151 and the first gear connecting rod 152, as shown in FIG. 21, the first gear connecting rod 152 is provided with two sliding grooves 152*a* symmetrically arranged on two sides. Correspondingly, two sliding blocks 151*a* are disposed in the first housing connecting rod 151, and the two sliding grooves 152*a* are connected to the two sliding blocks 151*a* in a slidable cooperation manner and in a one-to-one correspondence.

In some designs, as shown in FIG. 21, an embedded groove 151*b* may be provided in the first housing connecting rod 151, the first gear connecting rod 152 is assembled in the embedded groove 151*b*, and the sliding block 151*a* is disposed on a wall surface of the embedded groove 151*b*. In this way, the first housing connecting rod 151 in the embedded groove 151*b* may be slidably connected to the first gear connecting rod 152 by using a matched sliding block 151*a* and a matched sliding groove 152*a*.

Example 2: A sliding block may be disposed in the first gear connecting rod 152, and a sliding groove is provided in the first housing connecting rod 151. The sliding block on the first gear connecting rod 152 cooperates with the sliding groove on the first housing connecting rod 151, to implement sliding between the first housing connecting rod 151 and the first gear connecting rod 152. In other words, in comparison with Example 1, in Example 2, disposition positions of the sliding block and the sliding groove are interchanged, so that same slidable connection effect may be implemented. Therefore, reference may be made to the structure of disposing the sliding groove and the sliding block in Example 1. Details are not described herein again.

For a slidable connection structure between the second gear connecting rod 162 and the second housing connecting rod 161, reference may be made to the slidable connection structure between the first housing connecting rod 151 and the first gear connecting rod 152. Certainly, another structure may also be selected to implement rotating.

A structure of the first gear connecting rod 152 may be diversified. For example, in FIG. 21, the first gear connecting rod 152 includes a sliding part 1521 slidably connected to the first housing connecting rod 151 and a rotating part 1522 rotatably connected to the body 14. The sliding groove 152*a* is provided in the sliding part 1521, and the first gear 171 used to be meshed with the first rack 172 may be formed on the rotating part 1522.

The second gear connecting rod 162 also has a plurality of structures. To make balance of movement of the entire rotating shaft mechanism 100, the second gear connecting rod 162 may use a same structure as the first gear connecting rod 152. That is, a rotating part and a sliding part that are integrally formed are also included.

Figure 22:
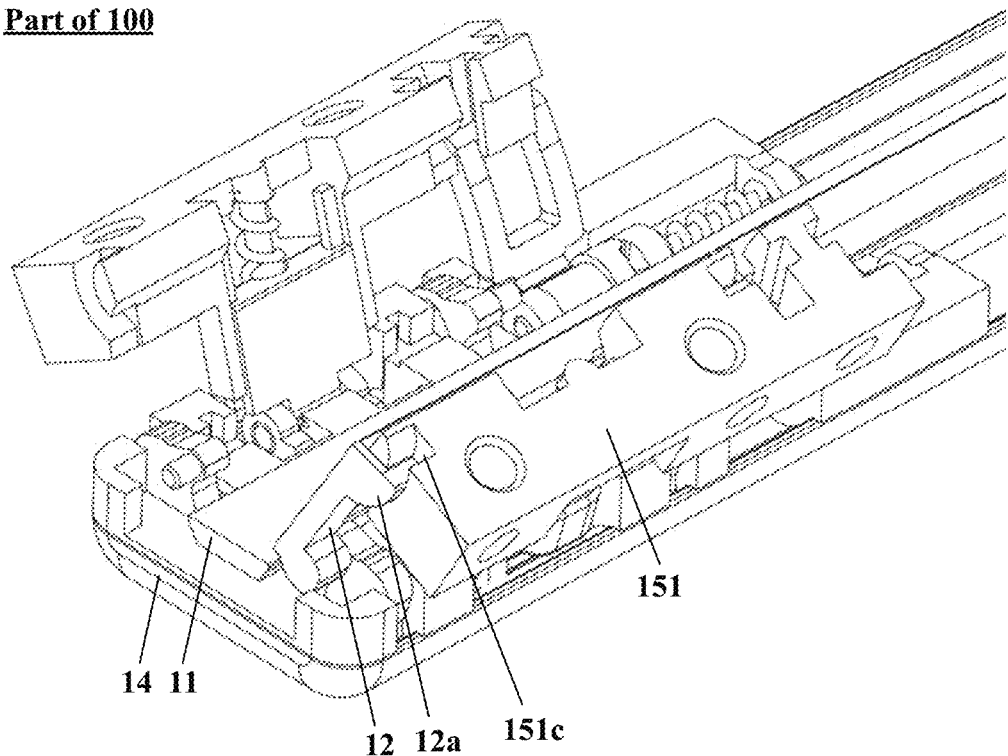
FIG. 22 is a diagram of a partial structure of a rotating shaft mechanism according to an embodiment of this application.

A rotatable connection between the first door plate 12 and the first housing connecting rod 151 has a plurality of implementation structures. For example, FIG. 22 is a diagram of a rotatable connection structure between a first door plate 12 and a first housing connecting rod 151, and FIG. 22 is a diagram of a partial structure of a rotating shaft mechanism 100 according to an embodiment of this application. A surface that is of the first door plate 12 and that is away from the flexible display 400 has a first door plate arcuate bump 12*a* extending toward a direction of the first housing connecting rod 151. A first arcuate clamping groove 151*c* is provided in the first housing connecting rod 151. The first door plate arcuate bump is assembled in the first arcuate clamping groove 151*c*, and may rotate relative to the first arcuate clamping groove 151*c*, to implement the rotatable connection between the first door plate 12 and the first housing connecting rod 151. For another example, disposition positions of the first arcuate clamping groove and the first door plate arcuate bump may be interchanged, that is, the first door plate arcuate bump is disposed in the first housing connecting rod 151, and the first arcuate clamping groove is provided in the first door plate 12. Similarly, the first door plate 12 and the first housing connecting rod 151 may rotate relative to each other.

When the rotatable connection structure shown in FIG. 22 is used, the first arcuate clamping groove 151*c* may be a quarter-arc groove, a third-arc groove, or the like. The first door plate arcuate bump 12*a* may be a quarter-arc bump, a third-arc bump, or the like. A person skilled in the art may adaptively adjust specific shapes of the first arcuate clamping groove 151*c* and the first door plate arcuate bump 12*a* based on an actual requirement. This is not specifically limited in this application.

For a rotatable connection structure between the second door plate 13 and the second housing connecting rod 161, refer to the rotatable connection between the first door plate 12 and the first housing connecting rod 151. For example, the second door plate 13 and the second housing connecting rod 161 also rotate relative to each other through rotatable cooperation between an arcuate bump and an arcuate clamping groove.

Figure 23:
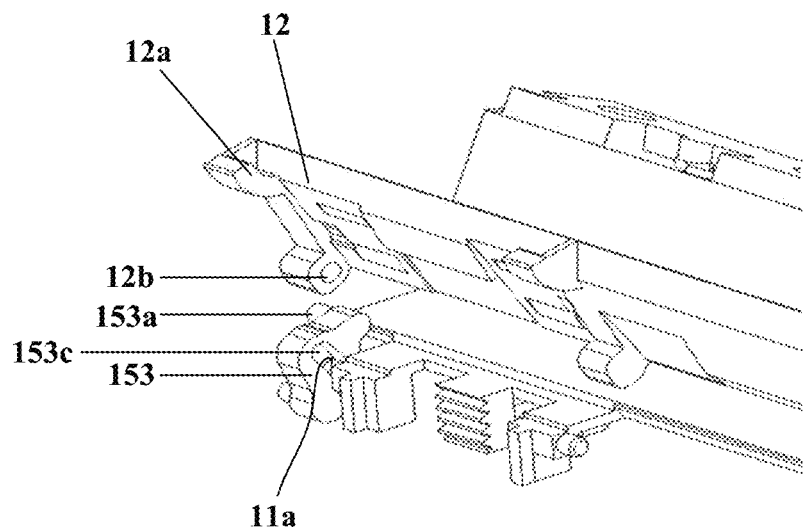
FIG. 23 is a diagram of a partial structure of a rotating shaft mechanism according to an embodiment of this application.

The rotatable connection between the first door plate 12 and the first secondary connecting rod 153 also has a plurality of implementation structures. For example, FIG. 23 is a diagram of a rotatable connection structure between a first door plate 12 and a first secondary connecting rod 153, and FIG. 23 is a diagram of a partial structure of a rotating shaft mechanism 100 according to an embodiment of this application. In FIG. 23, a first rotating hole 12*b* is disposed at a position that is on a surface of the first door plate 12 away from the flexible display 400 and that is close to the first secondary connecting rod 153. The first rotating hole 12*b* and the first door plate arcuate bump 12*a* may be located at two opposite ends of the first door plate 12. A first rotating shaft 153*a* that may be rotatably disposed in the first rotating hole 12*b* is formed on the first secondary connecting rod 153. The first rotating shaft 153*a* rotatably cooperates with the first rotating hole 12*b* such that the first door plate 12 is rotatably connected to the first secondary connecting rod 153. For another example, the first rotating shaft is disposed in the first door plate 12, and the first rotating hole is provided in the first secondary connecting rod 153. For another example, the first door plate 12 and the first secondary connecting rod 153 implement rotating of the first door plate 12 and the first secondary connecting rod 153 through rotatable cooperation between an arc block and an arc groove.

For the rotatable connection between the second door plate 13 and the second secondary connecting rod 163, refer to the rotatable connection structure between the first door plate 12 and the first secondary connecting rod 153. Details are not described herein again.

A slidable connection structure between the first secondary connecting rod 153 and the intermediate door plate 11 may use a connecting manner shown in FIG. 23. For example, a track groove 153*c* is provided in the first secondary connecting rod 153, and a sliding pin 11*a* that may slide along the track groove 153*c* is disposed in the intermediate door plate 11. FIG. 23 shows only an embodiment of a slidable connection, and does not constitute an absolute limitation on the slidable connection structure.

Figure 24:
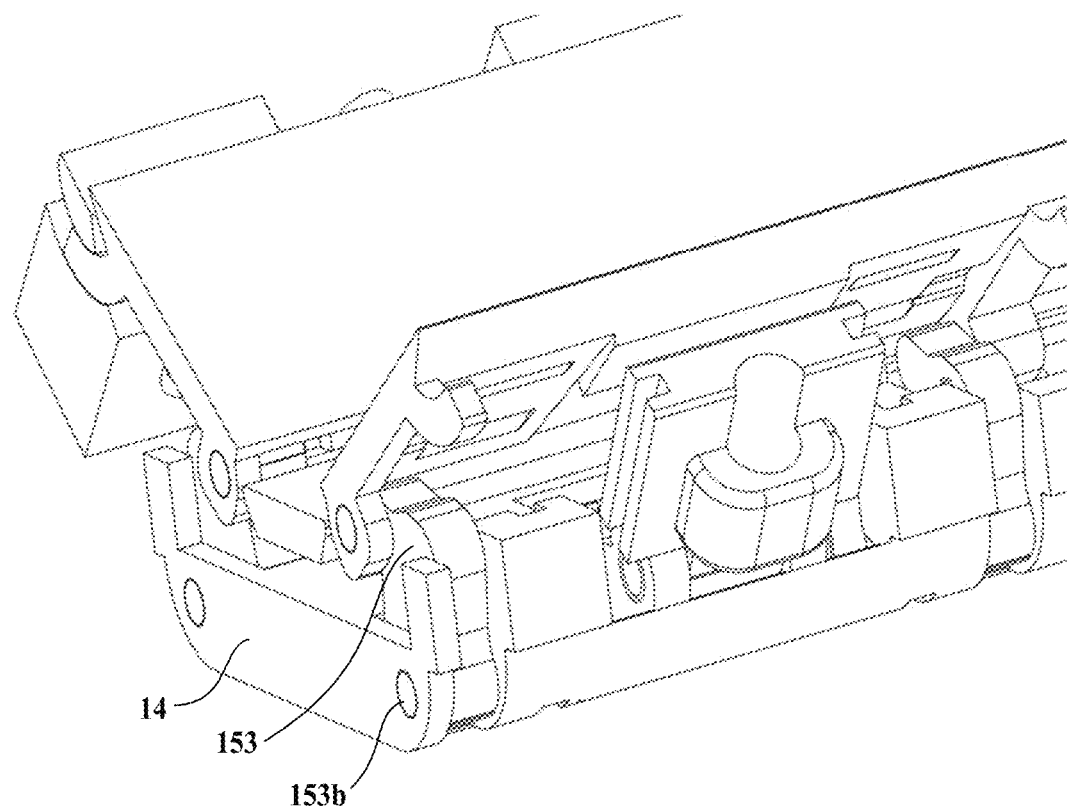
FIG. 24 is a diagram of a partial structure of a rotating shaft mechanism according to an embodiment of this application.

A rotatable connection structure between the first secondary connecting rod 153 and the body 14 also has a plurality of implementations. For example, as shown in FIG. 24, a second rotating shaft 153*b* is disposed at a position that is on the first secondary connecting rod 153 and that is close to the body 14, a second rotating hole for assembling the second rotating shaft 153*b* is provided in the body 14, and the second rotating shaft 153*b* is rotatably disposed in the second rotating hole, to implement a rotatable connection between the first secondary connecting rod 153 and the body 14. For another example, the first secondary connecting rod 153 may be rotatably connected to the body 14 through the rotatable cooperation between an arcuate groove and the arcuate bump.

Figure 25:
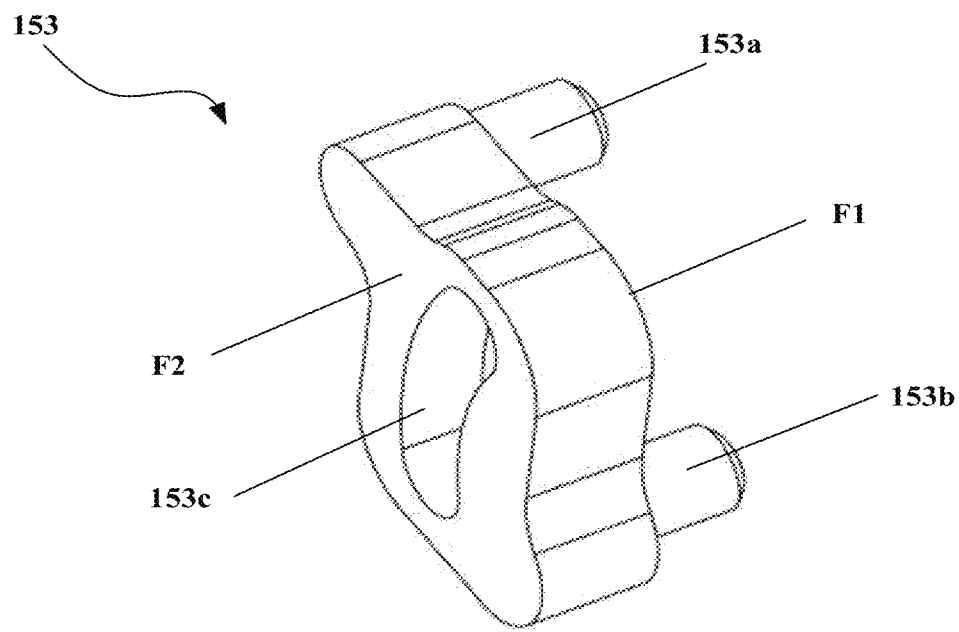
FIG. 25 is a diagram of a structure of a first secondary connecting rod according to an embodiment of this application.
Figure 26:
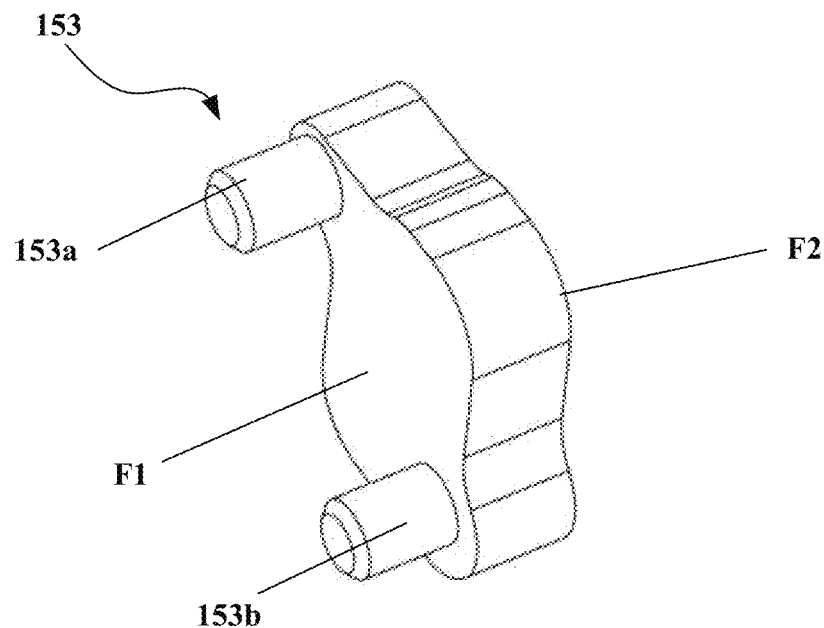
FIG. 26 is a diagram of a structure of a first secondary connecting rod according to an embodiment of this application.

In some designs, as shown in FIG. 25 and FIG. 26, FIG. 25 is a diagram of a structure of a first secondary connecting rod 153, and FIG. 26 is a diagram of a structure of a first secondary connecting rod 153 from another angle. The first secondary connecting rod 153 has a first surface F1 and a second surface F2 that are opposite to each other, the second rotating shaft 153b and the first rotating shaft 153a are both disposed in the first surface F1, and the track groove 153c is provided in the second surface F2. The track groove 153 may be a through groove that passes through the first surface F1 and the second surface F2, or may be a blind groove that does not pass through the first surface F1 and the second surface F2 shown in FIG. 25 and FIG. 26.

For the rotatable connection between the second door plate 13 and the second secondary connecting rod 163, the rotatable connection between the second secondary connecting rod 163 and the body 14, and the slidable connection between the second secondary connecting rod 163 and the intermediate door plate 11, refer to the rotatable connection structure between the first door plate 12 and the first secondary connecting rod 153, the rotatable connection between the first secondary connecting rod 153 and the body 14, and the slidable connection structure between the first secondary connecting rod 153 and the intermediate door plate 11. Details are not described herein again.

To enable the intermediate door plate 11 to move linearly relative to the body 14, the rotating shaft mechanism 100 further includes a guide structure 19. That is, when the intermediate door plate 11 is driven to move by using the meshing transmission structure, the guide structure 19 may be used to guide the intermediate door plate 11 to move linearly.

Figure 27:
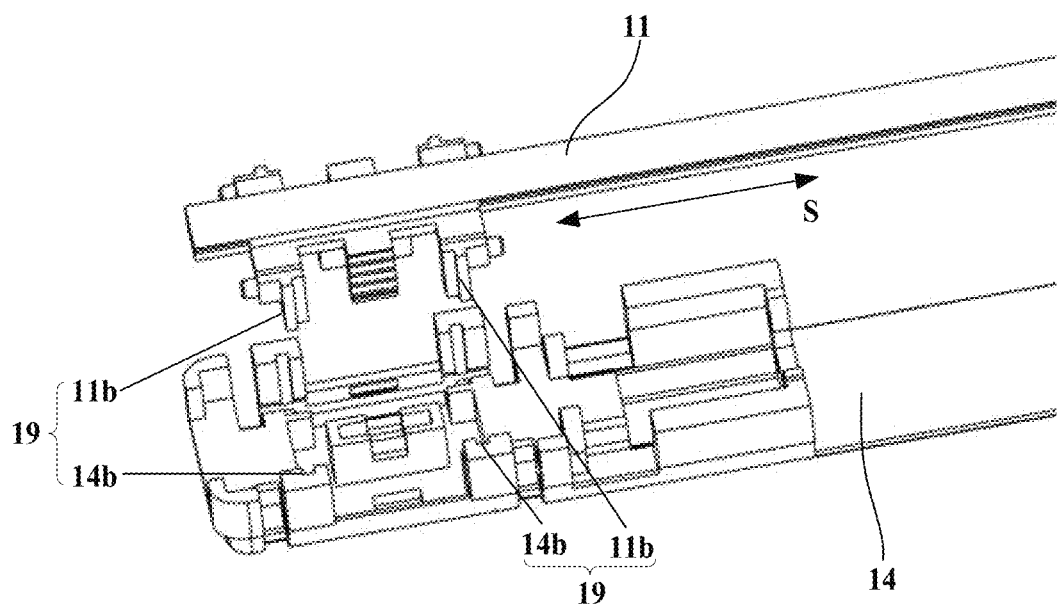
FIG. 27 is an exploded diagram of an intermediate door plate and a body according to an embodiment of this application.

FIG. 27 shows an implementable structure of the guide structure 19, and FIG. 27 is an exploded diagram of a body 14 and an intermediate door plate 11. Specifically, a guide groove 14b is provided in the body 14, a guide post lib is formed on a side surface of the intermediate door plate 11, an extension direction of the guide groove 14b is perpendicular to the length direction of the intermediate door plate 11, and the guide post lib is slidably disposed in the guide groove 14b, to form a guide structure 19. Disposition positions of the guide groove 14b and the guide post lib herein may be interchanged, that is, the guide groove is provided in the intermediate door plate 11, and the guide post is formed on the body 14. In this way, a guiding function may also be implemented.

Figure 28:
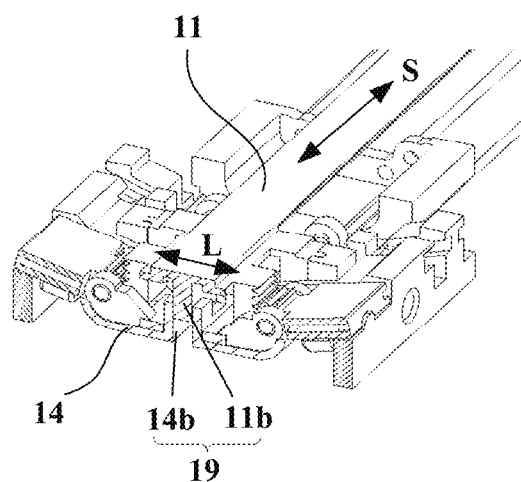
FIG. 28 is a diagram of a partial structure of a rotating shaft mechanism according to an embodiment of this application.

In some implementations, one guide structure 19 may be disposed, or a plurality of guide structures 19 may be disposed as shown in FIG. 27 and FIG. 28. For example, with reference to FIG. 27 and FIG. 28, three guide structures 19 are disposed, two of the three guide structures are disposed along the length direction (for example, a direction S in FIG. 28) of the intermediate door plate 11, and the other guide structure 19 is disposed along a width direction (for example, a direction L in FIG. 28) of the intermediate door plate 11. In such a design, the guide structures 19 are disposed at a plurality of different positions, so that stability of the intermediate door plate 11 moving linearly can be further enabled.

Figure 29:
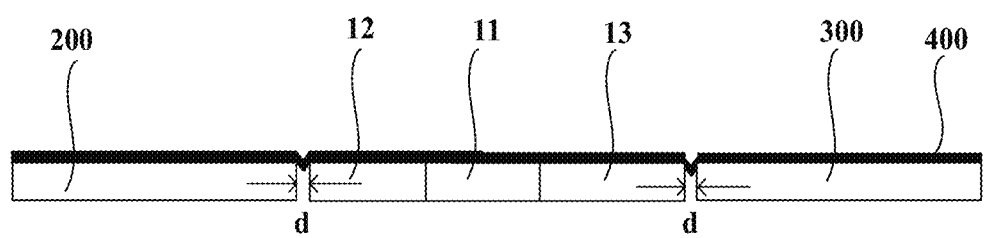
FIG. 29 is a state diagram of a flexible display having a wrinkle according to an embodiment of this application.

During specific implementation, when the electronic device is in the flattened state, because the flexible display 400 has a flexible feature, the flexible display 400 may be wrinkled and bent, and cannot be in the flattened state. For example, in some designs, when mechanical parts such as the first door plate 12, the intermediate door plate 11, the second door plate 13, the first housing 200, and the second housing 300 are assembled, there is an assembly gap. In this case, when the electronic device is in the flattened state, although the first door plate 12, the intermediate door plate 11, the second door plate 13, the first housing 200, and the second housing 300 may be in a same plane, as shown in FIG. 29, a gap d may exist between the first door plate 12 and the first housing 200 adjacent to the first door plate 12 and/or between the second door plate 12 and the second housing 300 adjacent to the second door plate 12. Therefore, a wrinkle phenomenon occurs in the flexible display 400 at a position having the gap d, and flatness of the flexible display 400 is reduced. User experience is obviously reduced especially when an operation position of the flexible display 100 is exactly at a position of the gap.

Figure 30:
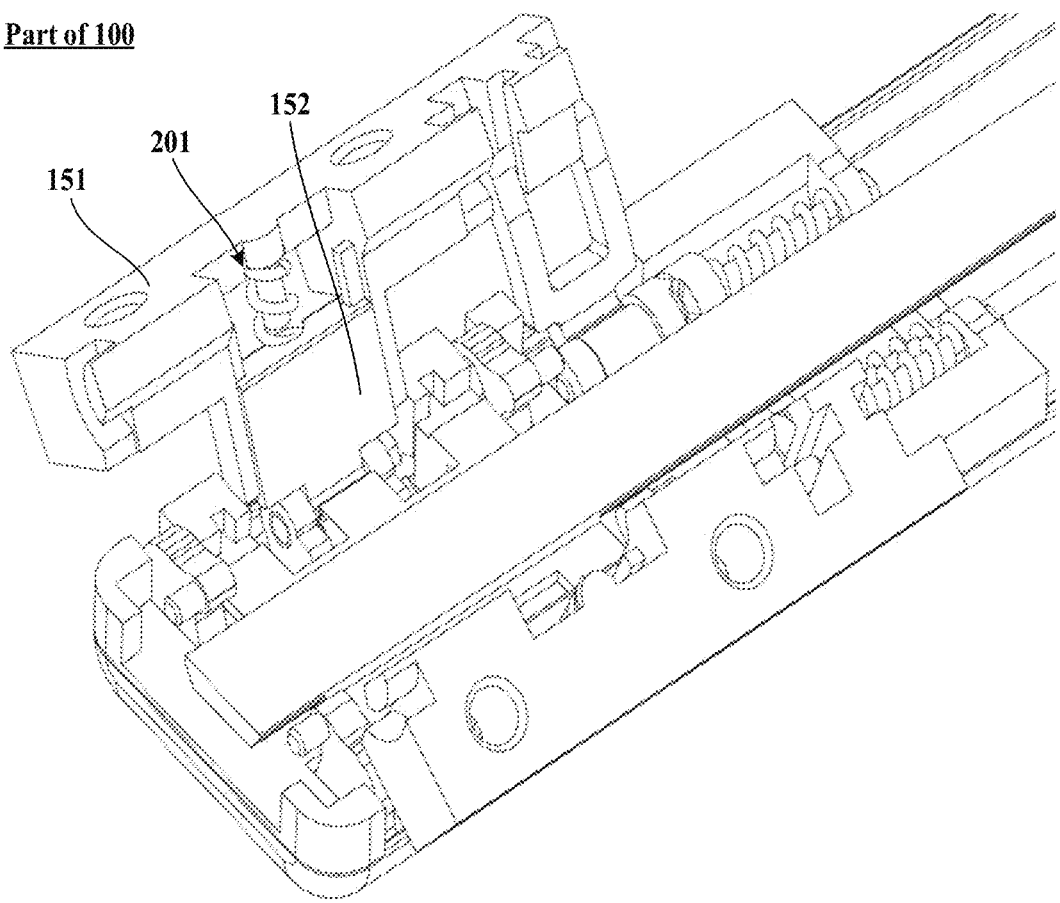
FIG. 30 is a diagram of a partial structure of a rotating shaft mechanism according to an embodiment of this application.
Figure 31:
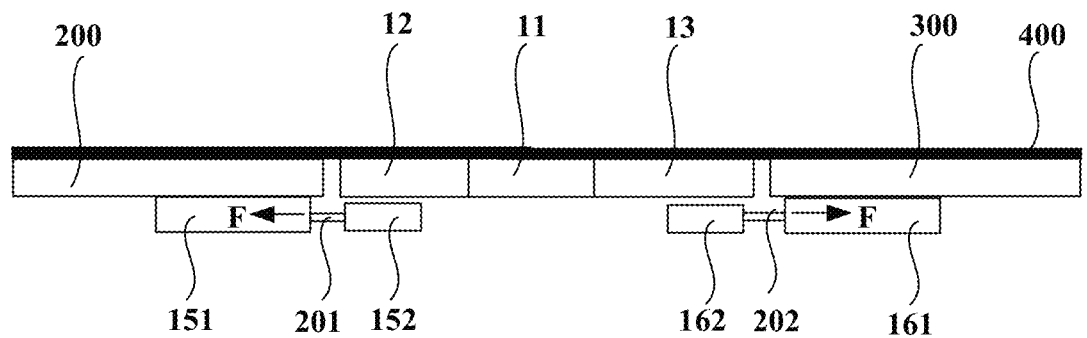
FIG. 31 is a simple schematic diagram of a rotating shaft mechanism and a flexible display according to an embodiment of this application.

To enable the flexible display 400 to be fully opened and flattened when the electronic device is in the flattened state, the rotating shaft mechanism 100 in this application further includes a screen pushing structure. For example, as shown in FIG. 30, a first screen pushing structure 201 may be disposed at a position at which the first housing connecting rod 151 and the first gear connecting rod 152 cooperate. FIG. 31 shows a screen push principle of the first screen pushing structure 201 in this application. As shown in FIG. 31, the first screen pushing structure 201 is configured to apply a push force F to the first housing connecting rod 151 in a direction away from the first gear connecting rod 152. Because the first housing connecting rod 151 is fixedly connected to the first housing 200, when the push force F in the direction away from the first gear connecting rod 152 is applied to the first housing connecting rod 151, a push force F in a direction away from the first door plate 12 is applied to the first housing 200. In this case, when the electronic device is in the flattened state, a push force is generated on a part of the flexible display 400 fixedly connected to the first housing 200, so that the flexible display may be further opened, and a crease may be eliminated, thereby improving user experience.

Figure 32:
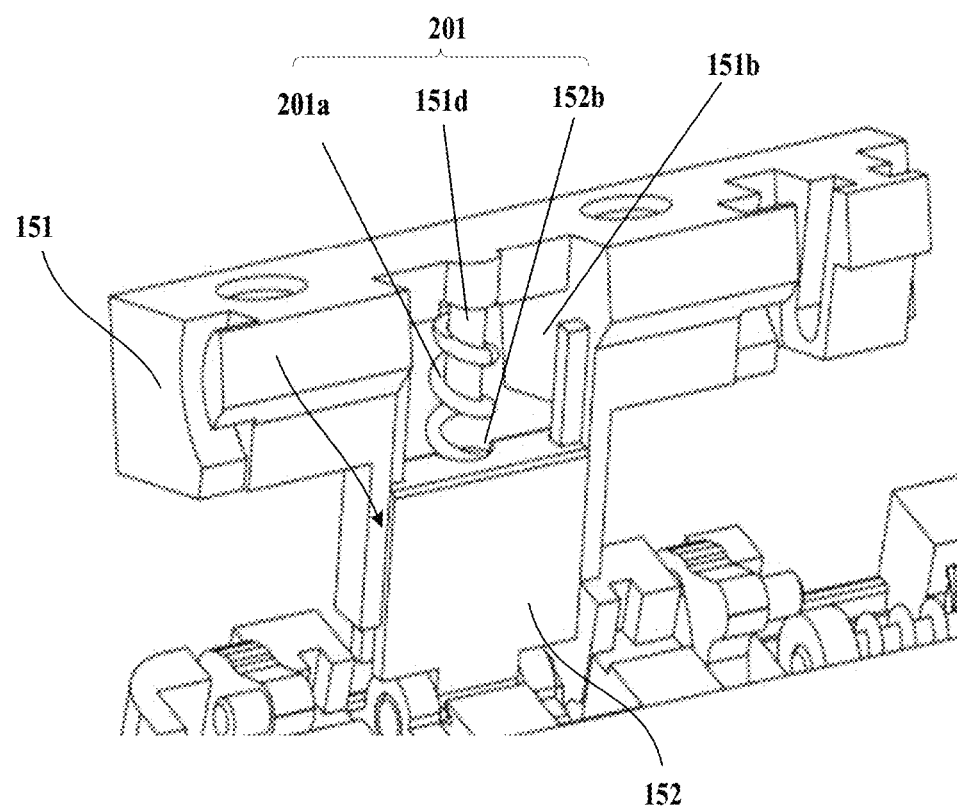
FIG. 32 is a diagram of a structure of a first screen pushing structure according to an embodiment of this application.

FIG. 32 shows an implementable structure of a first screen pushing structure 201. The first screen pushing structure 201 applies an elastic force to the first housing connecting rod 151 through the first gear connecting rod 152, to eliminate folding of the flexible display. Further, as shown in FIG. 32, the first screen pushing structure 201 includes a mounting hole 152b provided in the first gear connecting rod 152 and a support rod 151d that is formed on the first housing connecting rod 151 and that can extend into the mounting hole 152b. In addition, the first screen pushing structure 201 further includes an elastic piece 201a, and one end of the elastic piece 201a is sleeved on the support rod 151d. In an implementation, the elastic piece 201a herein may be a spring or another telescopic piece.

When the electronic device switches from the closed state to the flattened state, the first gear connecting rod 152 and the second gear connecting rod 162 move away from each other, the first gear connecting rod 152 that rotates relative to the body 14 drives the first housing connecting rod 151 to move, and the support rod 151d that moves with the first housing connecting rod 151 may extend into the mounting hole 152d, so that an end of the elastic piece 201a abuts against the mounting hole 152d and is in an energy storage state. Therefore, an elastic push force in a direction away from the direction of the first gear connecting rod 152 is applied to the first housing connecting rod 151.

It may be understood in this way that a screen push process of the first screen pushing structure 201 shown in FIG. 32 is that, not only when the electronic device is in the flattened state, the first gear connecting rod 152 may apply the elastic force to the first housing connecting rod 151 by using the first screen pushing structure 201, to eliminate wrinkles of the flexible display, but also when the electronic device is in an intermediate state or is close to the flattened state, the elastic force may also be applied to the first housing connecting rod 151. In this way, when the electronic device is close to the flattened state, the flexible display may be enabled to be in the flattened state under action of the push force, to alleviate the wrinkles.

In the foregoing connection relationship between the first gear connecting rod 152 and the first housing connecting rod 151, it is described that the first gear connecting rod 152 is connected to the first housing connecting rod 151 in a slidable cooperation manner. In addition, the first screen pushing structure 201 needs to be disposed at a cooperation position between the first gear connecting rod 152 and the first housing connecting rod 151. To simplify a structure and an assembly process, a structure used to slidably connect the first gear connecting rod 152 and the first housing connecting rod 151 and the first screen pushing structure 201 may be disposed by integration. As shown in FIG. 32, the support rod 151d is disposed in the embedded groove 151b, the first gear connecting rod 152 is slidably disposed in the embedded groove 151b, an extension direction of the support rod 151d is consistent with a direction in which the first gear connecting rod 152 and the first housing connecting rod 151 slide relative to each other, and the mounting hole 152d is provided on a surface that is of the first gear connecting rod 152 and that is opposite to the support rod 151d. In such a design, connection structures may be significantly simplified, to avoid that these structures occupy many spaces or the assembly process is complex.

With reference to FIG. 31, a second screen pushing structure 202 may be further disposed in the rotating shaft mechanism 100 in this application, and the second screen pushing structure 202 is disposed at a position at which the second gear connecting rod 162 and the second housing connecting rod 161 cooperate. The second screen pushing structure 202 may use the first screen pushing structure shown in FIG. 32.

In some designs, the first screen pushing structure 201 and the second screen pushing structure 202 may be symmetrically arranged with respect to the body 14, to improve flatness of the entire flexible display.

When the electronic device provided in this application is folded, the flexible display may need to suspend at a position to improve user experience. Therefore, the rotating shaft mechanism provided in this application further includes a damping structure. For example, when the electronic device is in the flattened state, a flattening force needs to be applied to the first housing 200 and the second housing 300 that carry the flexible display 400 by using the damping structure, so that the flexible display 400 remains in the flattened state. For another example, when the electronic device is in the closed state, a closing force needs to be applied to the first housing 200 and the second housing 300 by using the damping structure, so that the flexible display 400 remains in the closed state.

The damping structure provided in this application includes a first damping structure 301 and a second damping structure 302. The first damping structure 301 is configured to apply damping to the first housing 200, and the second damping structure 302 is configured to apply damping to the second housing 300. The following uses the first damping structure 301 as an example to describe a composition part of the damping structure. For the second damping structure 302, refer to a design of the first damping structure 301.

In some implementations, the first damping structure 301 may be disposed between the first housing connecting rod 151 and the body 14. When the first housing connecting rod 151 drives the first door plate 12 to rotate relative to the body 14, the first damping structure 301 is configured to apply resistance to the first housing connecting rod 151. In addition, because the first housing 200 carrying the flexible display 400 is relatively fixed to the first housing connecting rod 151. When the first damping structure 301 applies resistance to the first housing connecting rod 151, the first housing 200 carrying the flexible display 400 suspends at a position.

Figure 33:
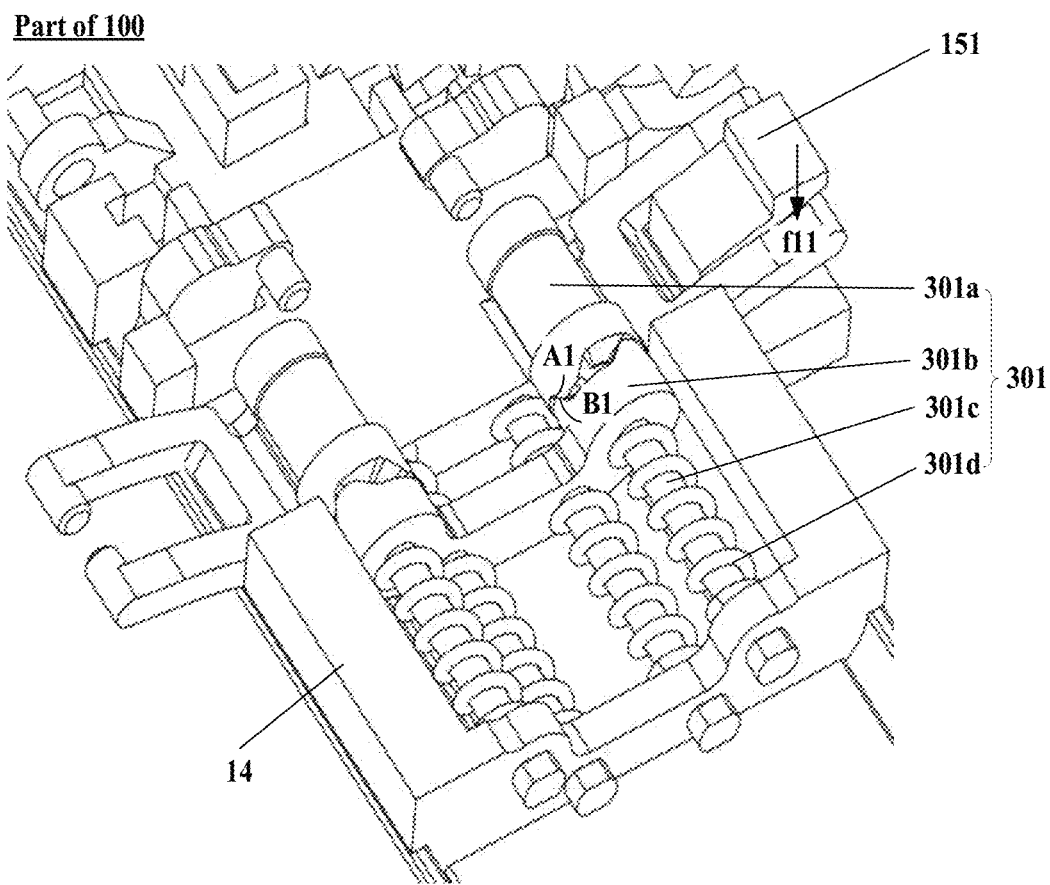
FIG. 33 is a diagram of a partial structure of a rotating shaft mechanism according to an embodiment of this application.

FIG. 33 is a diagram of a structure of a first damping structure 301. A specific structure is shown in FIG. 33. The first damping structure 301 includes a first cam connecting rod 301a, a first cam 301b, a first damping pin shaft 301c, and a first damping elastic piece 301d. The first damping pin shaft 301c is fixed on the body 14, and an extension direction of the first damping pin shaft 301c is consistent with a direction of a rotation axis of the first gear connecting rod 152 relative to the body 14. The first cam 301b is slidably disposed on the first damping pin shaft 301c, one end that is of the first cam connecting rod 301a and that is close to the body 14 is rotatably mounted on the first damping pin shaft 301c, one end that is of the first cam connecting rod 301a and that is away from the body 14 is slidably connected to the first housing connecting rod 151, and the first damping elastic piece 301d is sleeved on the first damping pin shaft 301c.

That is, when the first housing connecting rod 151 rotates, the first cam connecting rod 301a is slidably connected to the first housing connecting rod 151 such that the first cam connecting rod 301a may be driven to rotate relative to the body 14.

Figure 34:
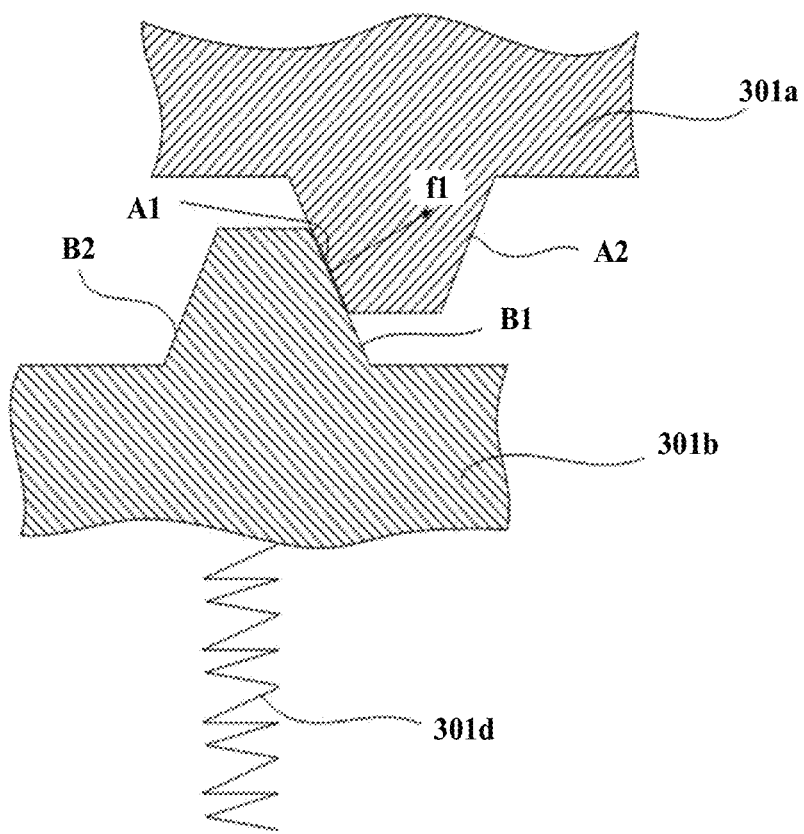
FIG. 34 is a diagram of a damping principle according to an embodiment of this application.

FIG. 34 is a diagram of a structure of a damping principle of the first damping structure 301 in FIG. 33. As shown in FIG. 34, the end that is of the first cam connecting rod 301a and that is close to the first cam 301b has a first damping surface A1 opposite to the first cam 301b and a second damping surface A2, and the first cam 301b has a third damping surface B1 opposite to the first cam connecting rod 301a and a fourth damping surface B2. With reference to FIG. 33 and FIG. 34, when the first housing connecting rod 151 drives the first cam connecting rod 301a to rotate to a first position, the first damping surface A1 abuts against the third damping surface B1, and the first damping elastic piece 301d is in the energy storage state, to generate a squeezing force f1 on the first cam connecting rod 301a. The squeezing force f1 may enable the first cam connecting rod 301a to generate a flattening force f11 shown in FIG. 33. In this way, because the first cam connecting rod 301a slidably cooperates with the first housing connecting rod 151, the first housing connecting rod 151 is subject to the flattening force f11 applied by the first cam connecting rod 301a. Under action of the flattening force f11, the first housing connecting rod 151 generates a flattening force on the first housing 200, and finally may apply the flattening force to the flexible display 400, to maintain a suspended flattened state.

Figure 35:
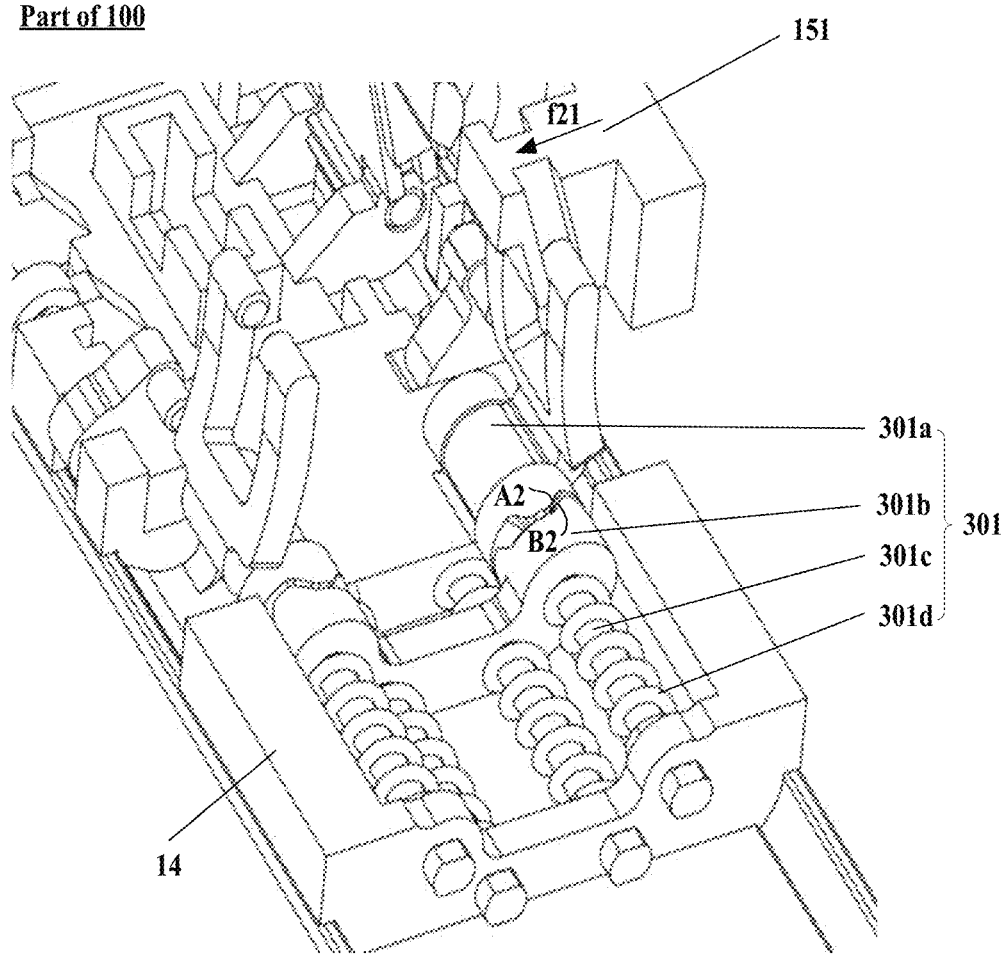
FIG. 35 is a diagram of a partial structure of a rotating shaft mechanism according to an embodiment of this application.
Figure 36:
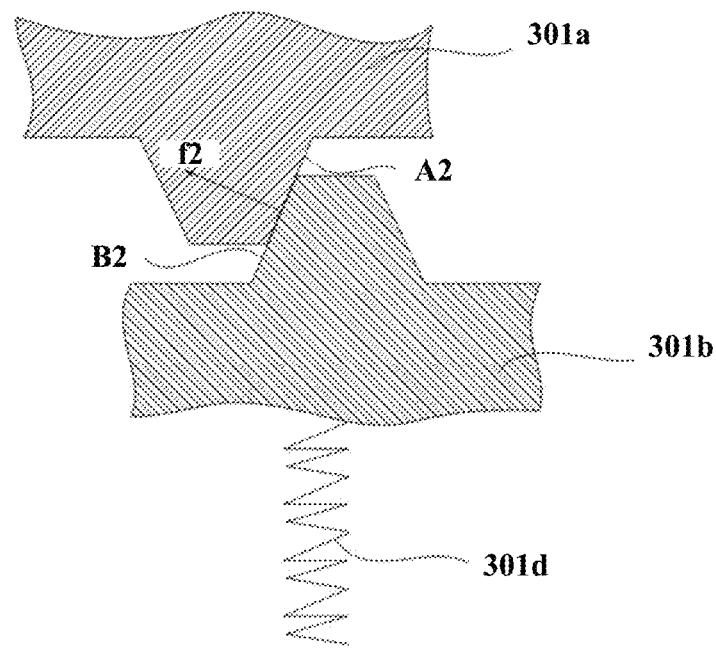
FIG. 36 is a principle diagram of damping according to an embodiment of this application.

FIG. 35 is a diagram of a structure of a first damping structure 301 when an electronic device is in a closed state, and FIG. 36 is a diagram of a structure of a damping principle of a first damping structure 301 when an electronic device is in a closed state. Specifically, when the first housing connecting rod 151 drives the first cam connecting rod 301a to rotate to a second position, the second damping surface A2 abuts against the fourth damping surface B2, and the first damping elastic piece 301*d* is in the energy storage state, so that a squeezing force f2 is generated on the first cam connecting rod 301*a*. The squeezing force f2 may enable the first cam connecting rod 301*a* to generate a closing force f21 shown in FIG. 35. Because the first cam connecting rod 301*a* slidably cooperates with the first housing connecting rod 151, the first housing connecting rod 151 is subject to the closing force f21 applied by the first cam connecting rod 301*a*. Under action of the closing force f21, the first housing connecting rod 151 generates a closing force on the first housing 200, and finally may enable the flexible display to keep a suspended closed state.

Figure 37:
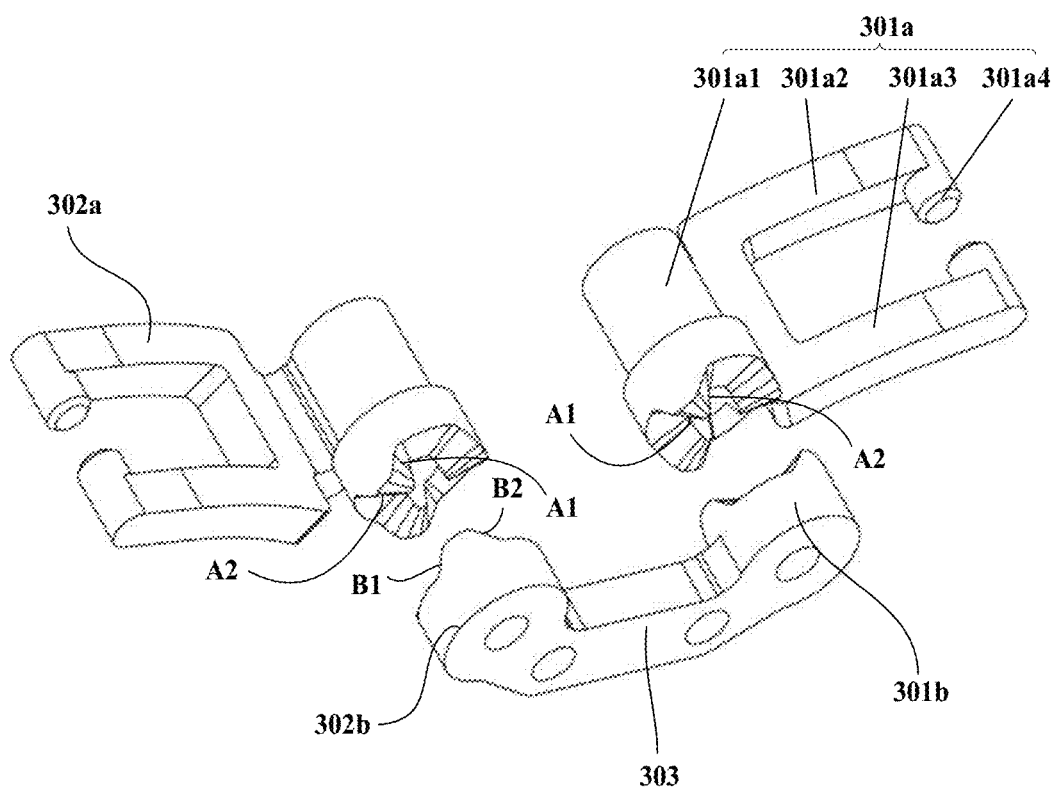
FIG. 37 is an exploded diagram of a first cam connecting rod and a first cam according to an embodiment of this application.

FIG. 37 shows an implementable structure of the first cam connecting rod 301*a*, and FIG. 37 is an exploded diagram of a first cam connecting rod 301*a* and a first cam 301*b*. In FIG. 37, the first cam connecting rod 301*a* includes a cam part 301*a*1, a first connecting rod part 301*a*2, and a second connecting rod part 301*a*3. With reference to FIG. 35 and FIG. 37, the cam part 301*a*1 is rotatably mounted on the first damping pin shaft 301*d*, the first damping surface A1 and the second damping surface A2 are formed on a surface that is of the cam part 301*a*1 and that faces the first cam 301*b*, and the first connecting rod part 301*a*2 and the second connecting rod part 301*a*3 are arranged in parallel. In addition, one end of the first connecting rod part 301*a*2 and one end of the second connecting rod part 301*a*3 are both connected to the cam part 301*a*1, and the other end of the first connecting rod part 301*a*2 and the other end of the second connecting rod part 301*a*3 are both slidably connected to the first housing connecting rod 151.

When the first cam connecting rod 301*a* that includes the first connecting rod part 301*a*2 and the second connecting rod part 301*a*3 shown in FIG. 37 is used, both the first connecting rod part 301*a*2 and the second connecting rod part 301*a*3 herein may apply an acting force to the first housing connecting rod 151, so that the flexible display can stably be in a suspended position.

Figure 38:
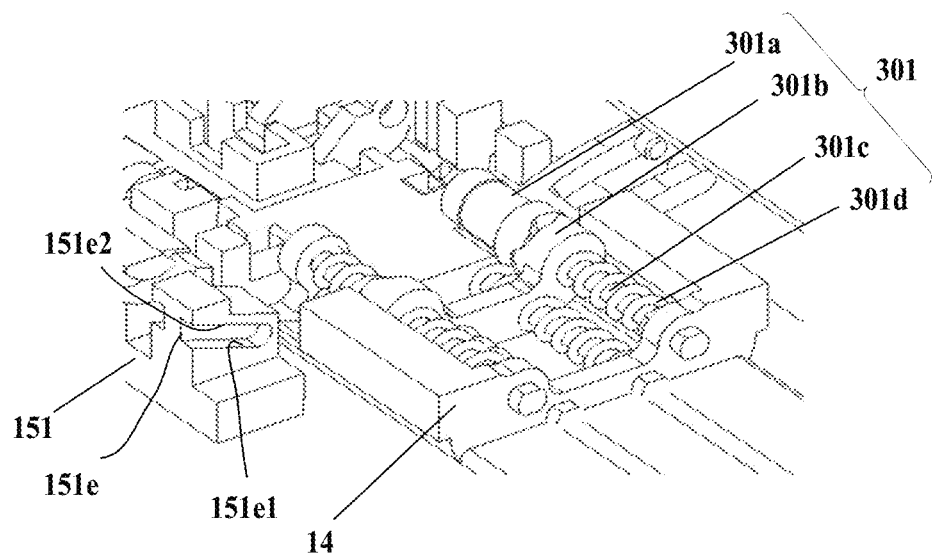
FIG. 38 is a diagram of a partial structure of a rotating shaft mechanism according to an embodiment of this application.

To implement a slidable connection between the first cam connecting rod 301*a* and the first housing connecting rod 151, in some designs, as shown in FIG. 37, a sliding block 301*a*4 may be formed at both ends of the first connecting rod part 301*a*2 and the second connecting rod part 301*a*3 that are close to the first housing connecting rod 151. As shown in FIG. 38, a sliding groove 151*e* may be disposed at a corresponding position of the first housing connecting rod 151, and the sliding groove 151*e* has a first abutting surface 151*e*1 and a second abutting surface 151*e*2.

With reference to FIG. 38 and FIG. 34, when the first damping surface A1 abuts against the third damping surface B1 to generate the squeezing force f1, the sliding block 301*a*4 located in the sliding groove 151*e* abuts against the first abutting surface 151*e*1 to apply the force f11 shown in FIG. 33 to the first housing connecting rod 151. Similarly, with reference to FIG. 38 and FIG. 36, when the second damping surface A2 abuts against the fourth damping surface B2 to generate the squeezing force f2, the sliding block 301*a*4 located in the sliding groove 151*e* abuts against the second abutting surface 151*e*2 to apply the force f21 shown in FIG. 35 to the first housing connecting rod 151.

In the structure of the first cam connecting rod 301*a* shown in FIG. 37, the cam part 301*a*1, the first connecting rod part 301*a*2, the second connecting rod part 301*a*3, and the sliding block 301*a*4 may be formed by using an integrated molding process, or may be connected through the connecting piece. For example, the cam part 301*a*1, the first connecting rod part 301*a*2, the second connecting rod part 301*a*3, and the sliding block 301*a*4 may be connected together by using a threaded connecting piece or adhesive.

Figure 39:
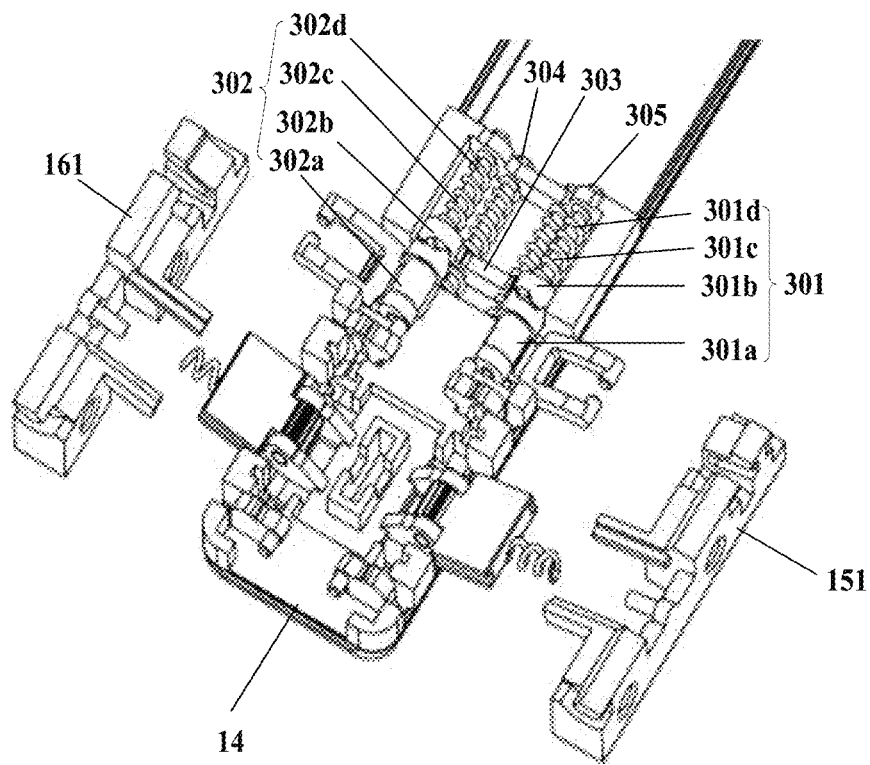
FIG. 39 is a diagram of a partial structure of a rotating shaft mechanism according to an embodiment of this application.

FIG. 39 is a diagram of a partial structure of a rotating shaft mechanism 100 including a first damping structure 301 and a second damping structure 302. The second damping structure 302 is similar to the first damping structure 301, and also includes a second cam connecting rod 302*a*, a second cam 302*b*, a second damping pin shaft 302*c*, and a second damping elastic piece 302*d*. The second damping pin shaft 302*c* and the first damping pin shaft 301*c* are also fixed on the body 14, an extension direction of the second damping pin shaft 302*c* is consistent with an extension direction of the first damping pin shaft 301*c*, the second cam 302*b* is slidably disposed on the second damping pin shaft 302*c*, one end that is of the second cam connecting rod 302*a* and that is close to the body 14 is rotatably mounted on the second damping pin shaft 302*c*, one end that is of the second cam connecting rod 302*a* and that is away from the body 14 is slidably connected to the second housing connecting rod 161, and the second damping elastic piece 302*d* is sleeved on the second damping pin shaft 302*c*.

A damping principle of the second damping structure 302 shown in FIG. 39 may be the same as the damping principle of the first damping structure 301. Details are not described herein again.

In addition, in some designs, the first cam 301*b* in the first damping structure 301 may be connected to the second cam 302*b* in the second damping structure 302, for example, may be connected by using a connecting rod 303 in FIG. 39. In this design, damping symmetry between the first housing 200 and the second housing 300 may be implemented.

In some implementations, the first cam 301*b*, the second cam 302*b*, and the connecting rod 303 may be formed by using the integrated molding process. Certainly, another connection structure may also be used for connection.

Still as shown in FIG. 39, not only the first damping pin shaft 301*c* and the second damping pin shaft 302*c* are included, but also a third damping pin shaft 304 and a fourth damping pin shaft 305 are included, or more damping pin shafts are included. A damping elastic piece is disposed on each damping pin shaft. By disposing a plurality of damping pin shafts, the first cam 301*b* and the second cam 302*b* connected to each other may move in a balanced and stable manner. In addition, because the damping elastic piece is disposed on each damping pin shaft, large squeezing force may be further applied to the first cam connecting rod 301*a* and the second cam connecting rod 301*a*, so that the flexible display 400 is stably in a suspended position. This improves opening and closing experience in the intermediate state.

Figure 40:
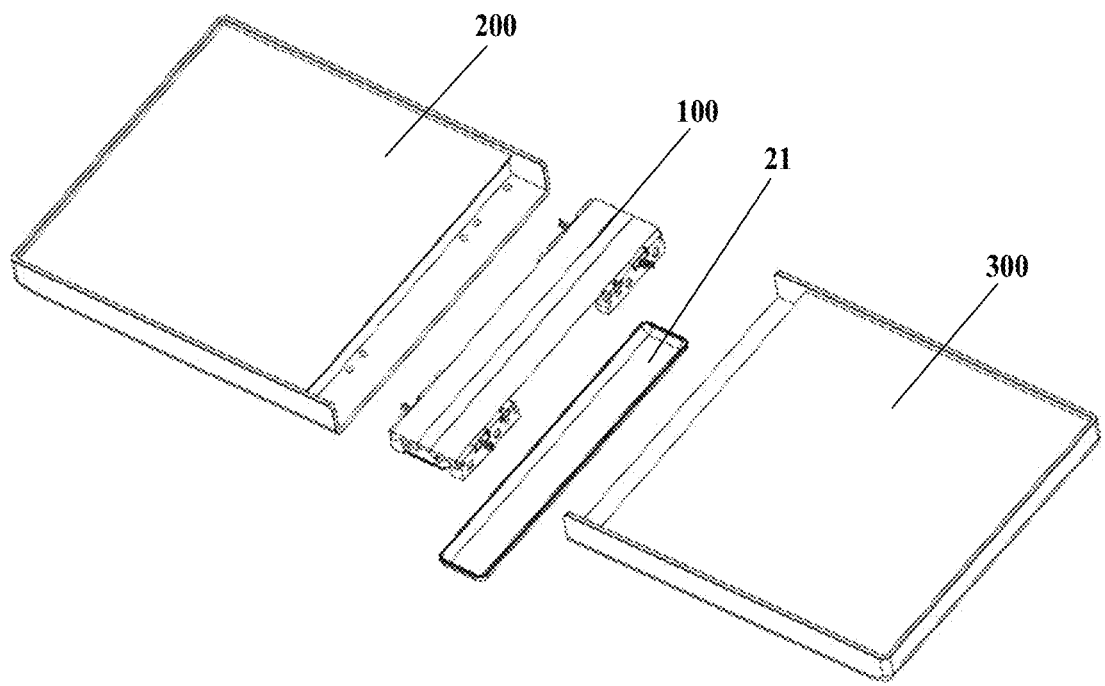
FIG. 40 is an exploded diagram of an electronic device according to an embodiment of this application.
Figure 41:
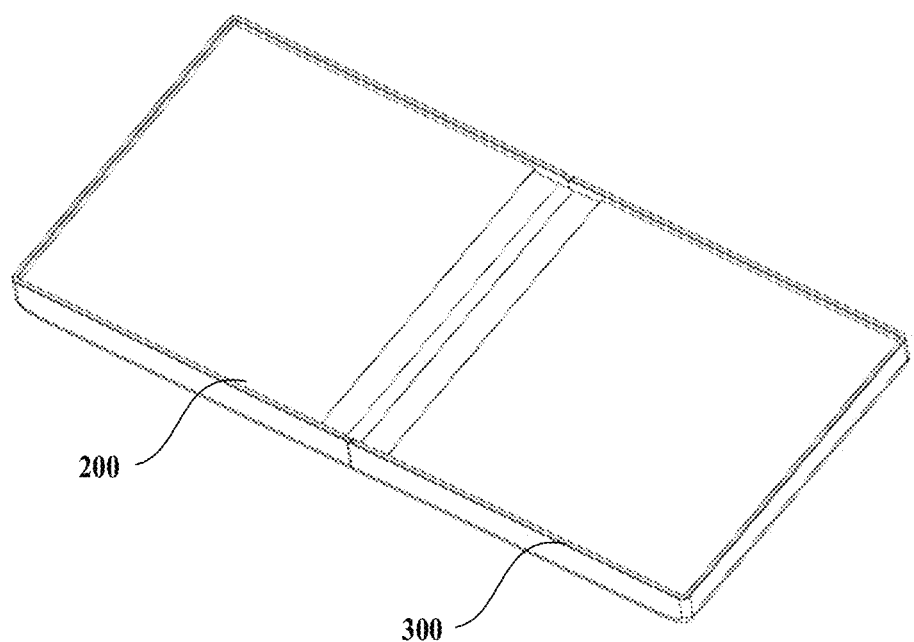
FIG. 41 is a diagram of a structure of an electronic device in a flattened state according to an embodiment of this application.
Figure 42:
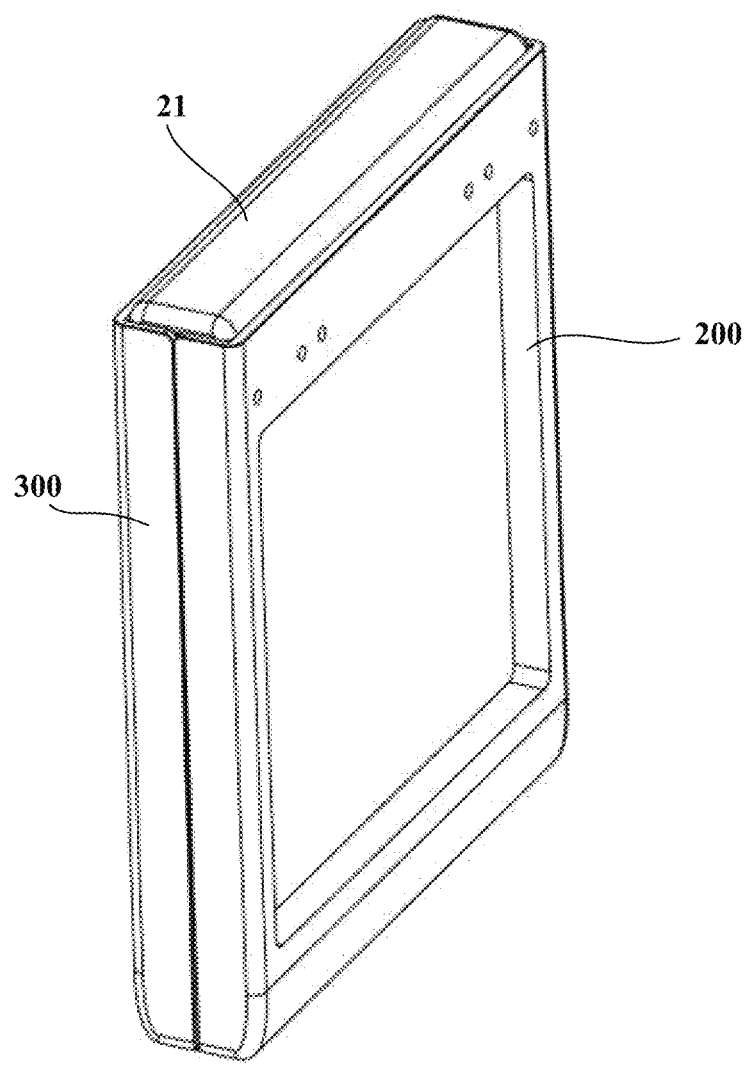
FIG. 42 is a diagram of a structure of an electronic device in a closed state according to an embodiment of this application.

FIG. 40 is an exploded diagram of an electronic device. The electronic device provided in this application further includes a decorative cover 21, and the body 14 of the rotating shaft mechanism 100 is fixed on the decorative cover 21. FIG. 41 is a diagram of a structure of an electronic device in a flattened state, and FIG. 42 is a diagram of a structure of an electronic device in a closed state. With reference to FIG. 41 and FIG. 42, after the first housing 200 and the second housing 300 are unfolded, an end surface of the first housing 200 is close to an end surface of the second housing 300, and a rotating shaft mechanism 100 including the decorative cover 21 is hidden in the first housing 200 and the second housing 300, that is, the rotating shaft mechanism 100 cannot be seen from an appearance of the electronic device. In this way, appearance aesthetics of the mobile terminal is improved. As shown in FIG. 42, when the first housing 200 and the second housing 300 are folded and are in a closed state, the decorative cover 21 of the rotating shaft mechanism 100 is exposed, to fill a gap between the first housing 200 and the second housing 300. In this way, the appearance aesthetics of the electronic device is also ensured. That is, regardless of whether the electronic device is in the closed state or in the flattened state, an internal structure is hidden, an appearance of an entire structure is complete, and aesthetics is good.

In the descriptions of this specification, specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotating shaft mechanism, comprising:
   a body comprising a first side, a second side, and a third side;
   an intermediate door plate comprising a fourth side and a fifth side;
   a first door plate disposed on the fourth side and comprising a first end and a second end;
   a second door plate disposed on the fifth side and comprising a third end and a fourth end, wherein the first door plate, the second door plate, and the intermediate door plate are located on the third side of the body;
   a first meshing transmission structure;
   a second meshing transmission structure;
   a first connecting rod assembly disposed on the first side of the body and comprising:
      a first housing connecting rod rotatably coupled to the first end of first door plate;
      a first gear connecting rod comprising:
         a fifth end rotatably coupled to the body;
         a sixth end away from the body and slidably coupled to the first housing connecting rod; and
         a seventh end coupled to the intermediate door plate in a first meshed manner through the first meshing transmission structure; and
      a first secondary connecting rod slidably coupled to the intermediate door plate and comprising:
         an eight end rotatably coupled to the second end of the first door plate;
         a ninth end is rotatably coupled to the body; and
   a second connecting rod assembly disposed on the second side of the body and comprising:
      a second housing connecting rod rotatably coupled to the third end of the second door plate;
      a second gear connecting rod comprising:
         a tenth end rotatably coupled to the body;
         an eleventh end away from the body and slidably coupled to the second housing connecting rod; and
         a twelfth end coupled to the intermediate door plate in a second meshed manner through the second meshing transmission structure; and
      a second secondary connecting rod slidably coupled to the intermediate door plate and comprising:
         a thirteenth end rotatably coupled to the fourth end of the second door plate;
         a fourteenth end is rotatably coupled to the body;
   wherein when the first gear connecting rod and the second gear connecting rod rotate toward each other, the first gear connecting rod and the intermediate door plate that are connected in the first meshed manner and the second gear connecting rod and the intermediate door plate that are connected in the second meshed manner are configured to drive the intermediate door plate to move in a first direction close to the body, the first housing connecting rod is configured to drive a fifteenth end that is of the first door plate and that is close to the body to move in a second direction away from the body, and the second housing connecting rod is configured to drive a sixteenth end that is of the second door plate and that is close to the body to move in a third direction away from the body, and
   wherein when the first gear connecting rod and the second gear connecting rod rotate away from each other, the first gear connecting rod and the intermediate door plate that are connected in the first meshed manner and the second gear connecting rod and the intermediate door plate that are connected in the second meshed manner are configured to drive the intermediate door plate to move in a fourth direction away from the body, the first housing connecting rod is configured to drive the fifteenth end that is of the first door plate and that is close to the body to move in a fifth direction close to the body, and the second housing connecting rod is configured to drive the sixteenth end that is of the second door plate and that is close to the body to move in a sixth direction close to the body.

2. The rotating shaft mechanism of claim 1, further comprising a first screen pushing structure configured to apply a push force to the first housing connecting rod in a seventh direction away from the first gear connecting rod to drive the first door plate and the second door plate to rotate away from each other when the first gear connecting rod and the second gear connecting rod rotate away from each other.

3. The rotating shaft mechanism of claim 2, wherein the first screen pushing structure comprises:
   a mounting hole provided in the first gear connecting rod;
   a support rod that is disposed on the first housing connecting rod and that can extend into the mounting hole; and
   an elastic piece, wherein a seventeenth end of the elastic piece is sleeved on the support rod,
   wherein the support rod is configured to extend into the mounting hole and an eighteenth end of the elastic piece is configured to abut against the mounting hole to apply an elastic push force to the first housing connecting rod in the seventh direction away from the first gear connecting rod when the first door plate and the second door plate rotate away from each other.

4. The rotating shaft mechanism of claim 3, wherein the first housing connecting rod comprises an embedded groove, wherein the first gear connecting rod is slidably disposed in the embedded groove, wherein the support rod is disposed in the embedded groove, wherein an extension direction of the support rod is consistent with an eighth direction in which the first gear connecting rod and the first housing connecting rod slide relative to each other, and wherein the mounting hole is provided on a surface that is of the first gear connecting rod and that is opposite to the support rod.

5. The rotating shaft mechanism of claim 1, wherein the first meshing transmission structure comprises a first gear provided at a nineteenth end that is of the first gear connecting rod and that is close to the intermediate door plate, wherein a first rack is disposed on the intermediate door plate and is externally meshed with the first gear, wherein a first rotation axis of the first gear is parallel to a second rotation axis of the first gear connecting rod, wherein the second meshing transmission structure comprises a second gear provided at a twentieth end that is of the second gear connecting rod and that is close to the intermediate door plate, wherein a second rack is disposed on the intermediate door plate and is externally meshed with the second gear, wherein a third rotation axis of the second gear is parallel to a fourth rotation axis of the second gear connecting rod, and wherein both an extension direction of the first rack and an extension direction of the second rack are perpendicular to a length direction of the intermediate door plate.

6. The rotating shaft mechanism of claim 1, further comprising a guide structure configured to guide the intermediate door plate to move relative to the body along a ninth direction perpendicular to a length direction of the intermediate door plate.

7. The rotating shaft mechanism of claim 6, wherein the guide structure comprises:
a guide hole provided in the body and extending along the ninth direction perpendicular to the length direction of the intermediate door plate; and
a guide block slidably disposed in the guide hole and fixed on the intermediate door plate.

8. The rotating shaft mechanism of claim 1, further comprising a first damping structure disposed between the first housing connecting rod and the body and configured to apply resistance to the first housing connecting rod when the first housing connecting rod drives the first door plate to rotate relative to the body, wherein a seventeenth end that is of the first damping structure and that is close to the first housing connecting rod is slidably coupled to the first housing connecting rod, and wherein an eighteenth end that is of the first damping structure and that is close to the body is rotatably connected to the body.

9. The rotating shaft mechanism of claim 8, wherein the first damping structure comprises:
a first damping pin shaft fixed on the body, wherein an extension direction of the first damping pin shaft is consistent with a tenth direction of a rotation axis of the first gear connecting rod relative to the body;
a first damping elastic piece sleeved on the first damping pin shaft;
a first cam connecting rod, wherein a nineteenth end that is of the first cam connecting rod and that is close to the body is rotatably mounted on the first damping pin shaft; and
a first cam is slidably disposed on the first damping pin shaft, wherein a twentieth end that is of the first cam connecting rod and that is away from the body is slidably connected to the first housing connecting rod, wherein the nineteenth end that is of the first cam connecting rod and that is close to the body has a first damping surface opposite to the first cam and a second damping surface, wherein the first cam has a third damping surface and a fourth damping surface,
wherein when the first housing connecting rod drives the first cam connecting rod to rotate until the first damping surface abuts against the third damping surface, the first damping elastic piece is in configured to be in an energy storage state to generate a force for the first cam connecting rod to flatten the first door plate, and
wherein when the first housing connecting rod drives the first cam connecting rod to rotate until the second damping surface abuts against the fourth damping surface, the first damping elastic piece is configured to be in an energy storage state to generate a force for the first cam connecting rod to close the first door plate.

10. The rotating shaft mechanism of claim 9, wherein the first cam connecting rod comprises:
a cam part rotatably mounted on the first damping pin shaft;
a first connecting rod part; and
a second connecting rod part, wherein the first connecting rod part and the second connecting rod part are arranged in parallel, wherein both one end of the first connecting rod part and one end of the second connecting rod part are connected to the cam part, and wherein both the other end of the first connecting rod part and the other end of the second connecting rod part are slidably connected to the first housing connecting rod.

11. The rotating shaft mechanism of claim 1, wherein the first secondary connecting rod comprises:
a first surface, wherein a first rotating shaft is disposed at a position that is on the first surface and that is close to the first door plate, wherein a first rotating hole is provided at a position that is on a surface of the first door plate facing the body and that is close to the first secondary connecting rod, and wherein the first rotating shaft is configured to rotate relative to the first rotating hole such that the first door plate is rotatably connected to the first secondary connecting rod; and
a second surface opposite to the first surface, wherein a second rotating shaft is disposed at a position that is on the first surface and that is close to the body, wherein a second rotating hole is provided at a position that is of the body and that is close to the first secondary connecting rod, and wherein the second rotating shaft is configured to rotate relative to the second rotating hole such that the body is rotatably connected to the first secondary connecting rod.

12. The rotating shaft mechanism of claim 11, wherein a track groove is provided on the second surface, wherein a sliding pin is disposed at a position that is of the intermediate door plate and that is close to the first secondary connecting rod, and wherein the sliding pin is configured to slide relative to the track groove such that the intermediate door plate is slidably connected to the first secondary connecting rod.

13. The rotating shaft mechanism of claim 1, wherein a surface that is of the first door plate and that faces the body has a first door plate arcuate bump extending toward the first housing connecting rod, wherein a first arcuate clamping groove for assembling the first door plate arcuate bump is provided on the first housing connecting rod, and wherein the first door plate arcuate bump is configured to slide relative to the first arcuate clamping groove such that the first door plate is rotatably connected to the first housing connecting rod.

14. The rotating shaft mechanism of claim 1, wherein when the first gear connecting rod and the second gear connecting rod rotate away from each other to drive the first door plate and the second door plate to rotate away from each other to a first position, the first door plate, the intermediate door plate, and the second door plate are configured to be located in a same plane to form a support surface, and wherein when the first gear connecting rod and the second gear connecting rod rotate toward each other to drive the first door plate and the second door plate to rotate toward each other to a second position, the first door plate, the intermediate door plate, and the second door plate are configured to form a display accommodating space through enclosure.

15. An electronic device, comprising:
a rotating shaft mechanism comprising:
- a body comprising a first side, a second side, and a third side;
- an intermediate door plate comprising a fourth side and a fifth side;
- a first door plate disposed on the fourth side and comprising a first end and a second end;
- a second door plate disposed on the fifth side and comprising a third end and a fourth end, wherein the first door plate, the second door plate, and the intermediate door plate are located on the third side of the body;
- a first meshing transmission structure;
- a second meshing transmission structure;
- a first connecting rod assembly disposed on the first side of the body and comprising:
  - a first housing connecting rod rotatably coupled to the first end of first door plate;
  - a first gear connecting rod comprising:
    - a fifth end rotatably coupled to the body;
    - a sixth end away from the body and slidably coupled to the first housing connecting rod; and
    - a seventh end coupled to the intermediate door plate in a first meshed manner through the first meshing transmission structure; and
  - a first secondary connecting rod slidably coupled to the intermediate door plate and comprising:
    - an eight end rotatably coupled to the second end of the first door plate;
    - a ninth end is rotatably coupled to the body; and
- a second connecting rod assembly disposed on the second side of the body and comprising:
  - a second housing connecting rod rotatably coupled to the third end of the second door plate;
  - a second gear connecting rod comprising:
    - a tenth end rotatably coupled to the body;
    - an eleventh end away from the body and slidably coupled to the second housing connecting rod; and
    - a twelfth end coupled to the intermediate door plate in a second meshed manner through the second meshing transmission structure; and
  - a second secondary connecting rod slidably coupled to the intermediate door plate and comprising:
    - a thirteenth end rotatably coupled to the fourth end of the second door plate;
    - a fourteenth end is rotatably coupled to the body;
  - wherein when the first gear connecting rod and the second gear connecting rod rotate toward each other, the first gear connecting rod and the intermediate door plate that are connected in the first meshed manner and the second gear connecting rod and the intermediate door plate that are connected in the second meshed manner are configured to drive the intermediate door plate to move in a first direction close to the body, the first housing connecting rod is configured to drive a fifteenth end that is of the first door plate and that is close to the body to move in a second direction away from the body, and the second housing connecting rod is configured to drive a sixteenth end that is of the second door plate and that is close to the body to move in a third direction away from the body, and
  - wherein when the first gear connecting rod and the second gear connecting rod rotate away from each other, the first gear connecting rod and the intermediate door plate that are connected in the first meshed manner and the second gear connecting rod and the intermediate door plate that are connected in the second meshed manner are configured to drive the intermediate door plate to move in a fourth direction away from the body, the first housing connecting rod is configured to drive the fifteenth end that is of the first door plate and that is close to the body to move in a fifth direction close to the body, and the second housing connecting rod is configured to drive the sixteenth end that is of the second door plate and that is close to the body to move in a sixth direction close to the body;
- a first housing comprising a first surface and fixedly coupled to the first housing connecting rod;
- a second housing comprising a second surface and fixedly coupled to the second housing connecting rod; and
- a flexible display fixedly coupled to each of the first surface and the second surface and consecutively covering the first surface, the rotating shaft mechanism, and the second surface.

16. The electronic device of claim 15, wherein the flexible display comprises:
- a first region fixedly coupled to the first surface of the first housing;
- a second region fixedly coupled to a surface that is of a first door plate and that faces the flexible display;
- a third region disposed relative to an intermediate door plate, and can move relative to the intermediate door plate;
- a fourth region fixedly coupled to a surface that is of a second door plate and that faces the flexible display; and
- a fifth region fixedly coupled to the second surface of the second housing, wherein the first region, the second region, the third region, the fourth region and the fifth region are consecutively disposed.

17. The electronic device of claim 15, wherein the rotating shaft mechanism further comprises a first screen pushing structure configured to apply a push force to the first housing connecting rod in a seventh direction away from the first gear connecting rod to drive the first door plate and the second door plate to rotate away from each other when the first gear connecting rod and the second gear connecting rod rotate away from each other.

18. The electronic device of claim 17, wherein the first screen pushing structure comprises:
- a mounting hole provided in the first gear connecting rod;
- a support rod that is disposed on the first housing connecting rod and that can extend into the mounting hole; and
- an elastic piece, wherein a seventeenth end of the elastic piece is sleeved on the support rod, and wherein when the first door plate and the second door plate rotate away from each other, the support rod is configured to extend into the mounting hole, and a eighteenth end of the elastic piece is configured to abut against the mounting hole to apply an elastic push force to the first housing connecting rod in an eighth direction away from the first gear connecting rod.

19. The electronic device of claim 18, wherein the first housing connecting rod is provided with an embedded groove, wherein the first gear connecting rod is slidably disposed in the embedded groove, wherein the support rod is disposed in the embedded groove, wherein an extension direction of the support rod is consistent with a ninth direction in which the first gear connecting rod and the first housing connecting rod slide relative to each other, and wherein the mounting hole is provided on a surface that is of the first gear connecting rod and that is opposite to the support rod.

20. The electronic device of claim 15, wherein the first meshing transmission structure comprises:
- a first gear provided at a nineteenth end that is of the first gear connecting rod and that is close to the intermediate door plate, wherein a first rotation axis of the first gear is parallel to a second rotation axis of the first gear connecting rod; and
- a first rack that is disposed on the intermediate door plate and that is externally meshed with the first gear, and wherein the second meshing transmission structure comprises:
- a second gear provided at a twentieth end that is of the second gear connecting rod and that is close to the intermediate door plate; and
- a second rack that is disposed on the intermediate door plate and that is externally meshed with the second gear, wherein a third rotation axis of the second gear is parallel to a fourth rotation axis of the second gear connecting rod, and wherein both an extension direction of the first rack and an extension direction of the second rack are perpendicular to a length direction of the intermediate door plate.

* * * * *